(12) United States Patent
Kimura et al.

(10) Patent No.: US 12,468,384 B2
(45) Date of Patent: Nov. 11, 2025

(54) SENSOR DEVICE, NONTRANSITORY RECORDING MEDIUM, AND PRESUMING METHOD

(71) Applicants: Yuta Kimura, Kanagawa (JP); Haruki Murata, Tokyo (JP)

(72) Inventors: Yuta Kimura, Kanagawa (JP); Haruki Murata, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/795,196

(22) Filed: Aug. 6, 2024

(65) Prior Publication Data

US 2025/0053230 A1  Feb. 13, 2025

(30) Foreign Application Priority Data

Aug. 10, 2023 (JP) ................. 2023-131447

(51) Int. Cl.
| | |
|---|---|
| *G06F 3/01* | (2006.01) |
| *A61B 5/00* | (2006.01) |
| *A61B 5/024* | (2006.01) |
| *G06F 3/16* | (2006.01) |

(52) U.S. Cl.
CPC .......... *G06F 3/012* (2013.01); *A61B 5/02438* (2013.01); *A61B 5/746* (2013.01); *G06F 3/017* (2013.01); *G06F 3/167* (2013.01)

(58) Field of Classification Search
CPC .......... G06F 3/012; G06F 3/017; G06F 3/167; G06F 3/011; A61B 5/02438; A61B 5/746; A61B 5/6822; G06V 40/20
See application file for complete search history.

(56) References Cited

U.S. PATENT DOCUMENTS

| | | | | |
|---|---|---|---|---|
| 5,963,891 | A * | 10/1999 | Walker | G06F 3/011 |
| | | | | 73/379.03 |
| 9,237,393 | B2 * | 1/2016 | Abrahamsson | H04R 1/1041 |
| 9,685,926 | B2 * | 6/2017 | Mehta | H03G 3/32 |
| 10,317,897 | B1 * | 6/2019 | Kentley-Klay | B60R 16/037 |
| 11,128,962 | B2 * | 9/2021 | Feilner | H04R 25/48 |
| 11,540,753 | B1 * | 1/2023 | Wilcox | A61B 5/746 |
| 2006/0176831 | A1 * | 8/2006 | Greenberg | H04L 67/535 |
| | | | | 370/260 |
| 2008/0218963 | A1 * | 9/2008 | Wu | H01L 23/427 |
| | | | | 165/104.34 |
| 2011/0066064 | A1 * | 3/2011 | Jangle | A61B 5/6822 |
| | | | | 600/534 |
| 2011/0196519 | A1 * | 8/2011 | Khoury | H04N 21/42201 |
| | | | | 700/94 |

(Continued)

FOREIGN PATENT DOCUMENTS

| | | | | |
|---|---|---|---|---|
| CN | 111930230 B | * | 7/2024 | ............. G06F 1/163 |
| JP | 2019-017673 A | | 2/2019 | |

OTHER PUBLICATIONS

Extended European Search Report issued Jan. 7, 2025 in European Patent Application No. 24193507.1, 12 pages.

*Primary Examiner* — Grant Sitta
(74) *Attorney, Agent, or Firm* — XSENSUS LLP

(57) ABSTRACT

A sensor device includes a first inertial sensor that contacts a body of a user, a second inertial sensor that contacts a neck of the user, and circuitry that presumes a behavior of the user based on a first signal detected by the first inertial sensor and a second signal detected by the second inertial sensor.

18 Claims, 32 Drawing Sheets

9A(9)

(56) References Cited

U.S. PATENT DOCUMENTS

| | | | | |
|---|---|---|---|---|
| 2011/0313768 A1* | 12/2011 | Klein | .................. | G06F 3/017 |
| | | | | 715/728 |
| 2012/0002822 A1 | 1/2012 | Peissig et al. | | |
| 2015/0261298 A1* | 9/2015 | Li | .................. | G06F 3/017 |
| | | | | 345/156 |
| 2015/0279102 A1* | 10/2015 | Fleck | .................. | G06V 40/20 |
| | | | | 345/87 |
| 2017/0311092 A1* | 10/2017 | Secall | .................. | G10L 25/60 |
| 2017/0359467 A1* | 12/2017 | Norris | .................. | H04S 7/302 |
| 2018/0228403 A1* | 8/2018 | Li | .................. | A61B 5/7405 |
| 2019/0150795 A1 | 5/2019 | Lu | | |
| 2021/0373676 A1 | 12/2021 | Jorasch et al. | | |
| 2022/0383338 A1* | 12/2022 | Sunder | .................. | G06Q 30/0201 |
| 2023/0171541 A1* | 6/2023 | Kang | .................. | H04R 3/005 |
| | | | | 381/92 |

\* cited by examiner

FIG. 1A
FIG. 1B
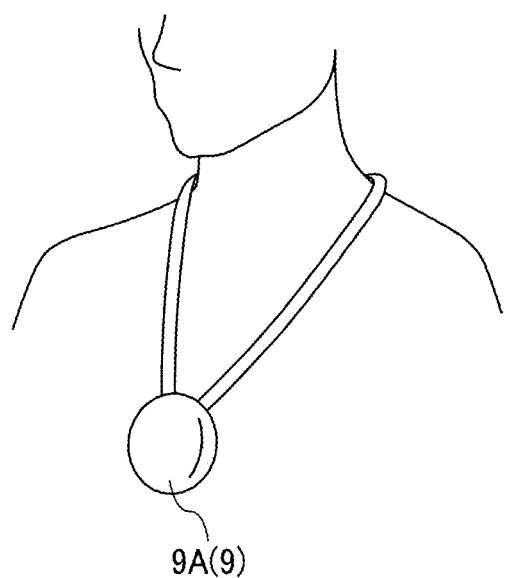
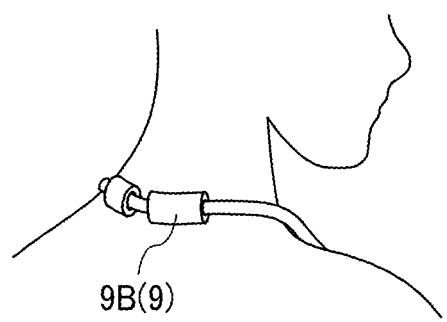
9A(9)
9B(9)

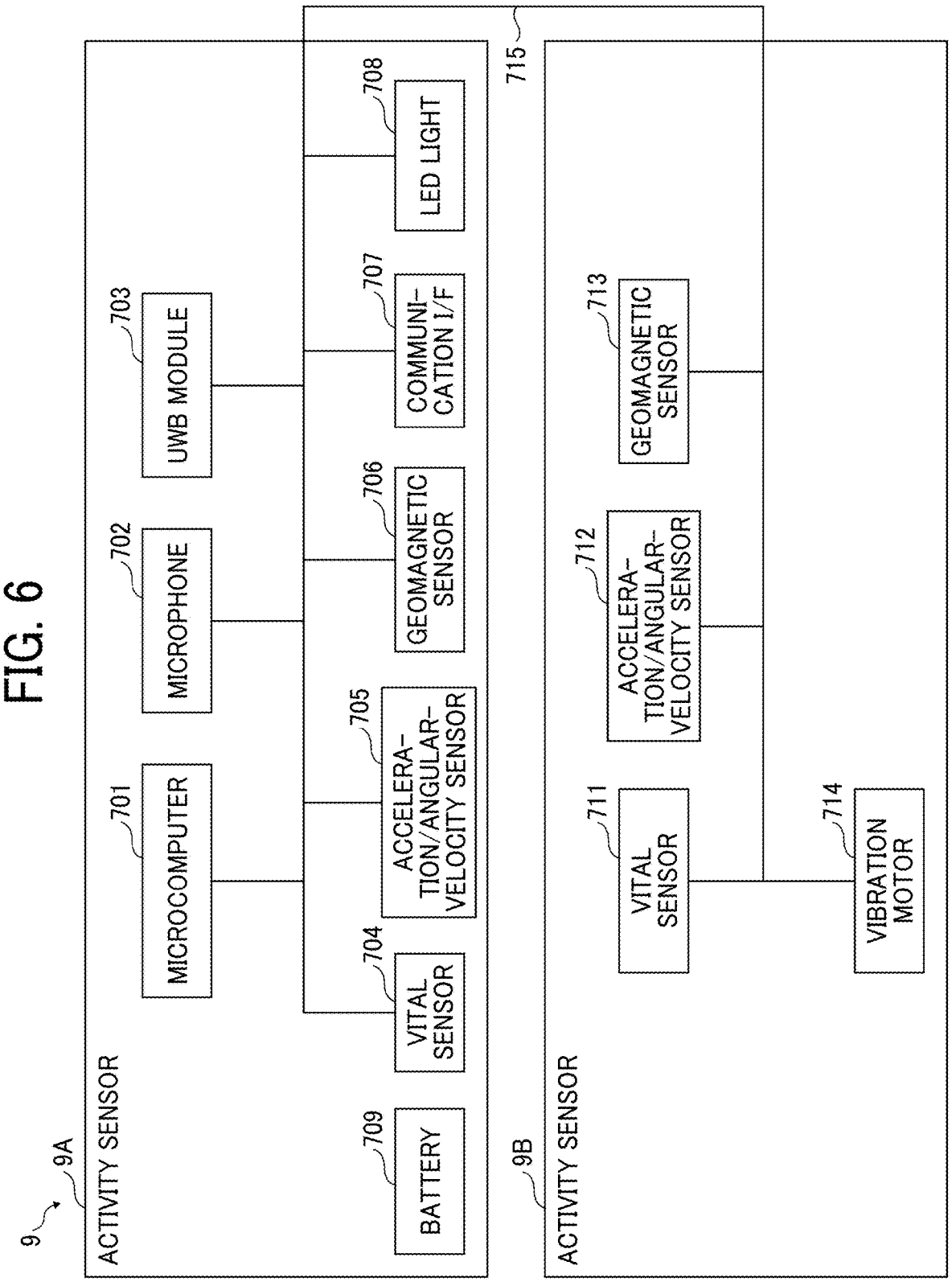

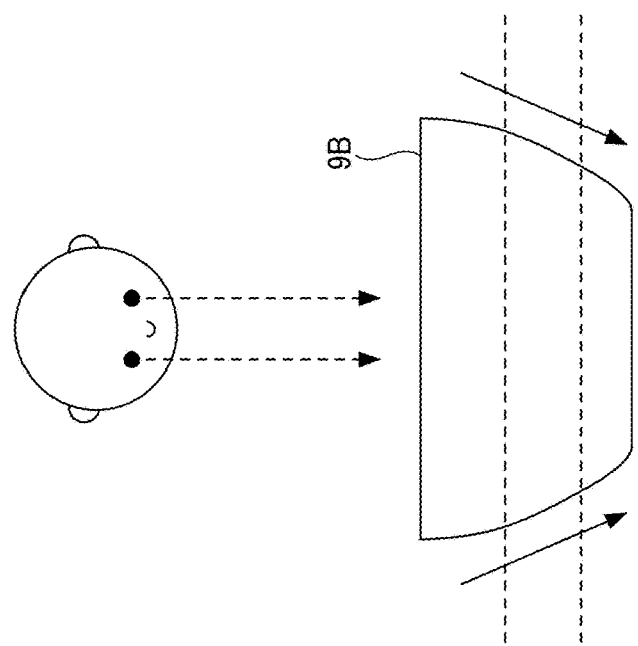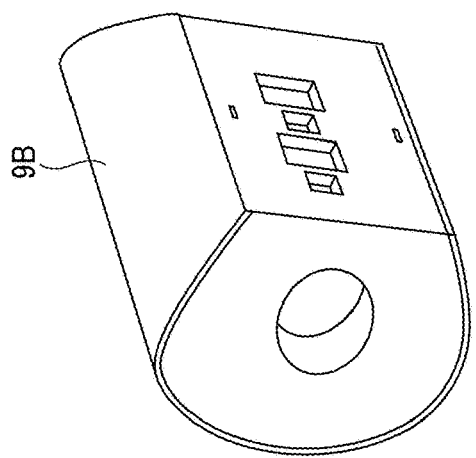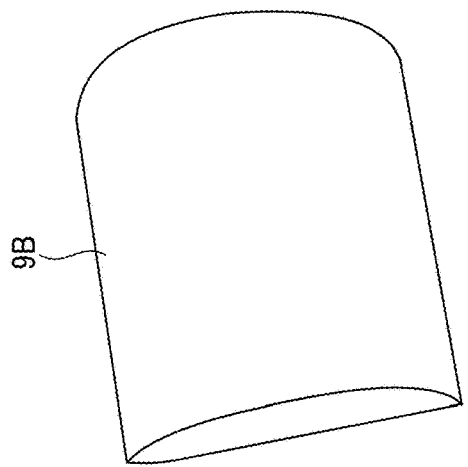

| TIME | POSITIONAL INFORMATION | DIRECTION | BEHAVIOR | POSTURE | HEART RATE | UTTERANCE DATA | REINFORCEMENT | PSYCHOLOGICAL SAFETY | LISTENING LEVEL |
|---|---|---|---|---|---|---|---|---|---|
| 10:10:01 | x1,y1 | 15° | — | 0° | 70 | — | — | — | — |
| 10:10:02 | x2,y2 | 20° | NODDING | 0° | 65 | YEAH | Y | — | HIGH |
| ... | ... | ... | ... | ... | ... | ... | ... | ... | ... |
| 10:20:15 | x3,y3 | 30° | BACKWARD LEANING | 30° | 60 | — | — | — | — |
| ... | ... | ... | ... | ... | ... | ... | ... | ... | ... |
| 10:22:31 | x4,y4 | 40° | FORWARD LEANING | −20° | 80 | — | — | — | — |
| ... | ... | ... | ... | ... | ... | ... | ... | ... | ... |
| 10:25:22 | x5,y5 | 50° | HEAD SHAKING | 0° | 100 | ARE YOU SURE? | Y | LOW | — |
| ... | ... | ... | ... | ... | ... | ... | ... | ... | ... |
| 10:28:06 | x6,y6 | 60° | HEAD COCKING | 0° | 90 | HMM | Y | — | HIGH |
| ... | ... | ... | ... | ... | ... | ... | ... | ... | ... |

| BEHAVIOR | UTTERANCE DATA |
|---|---|
| NODDING | YEAH |
| HEAD COCKING | HMM |
| HEAD SHAKING | ARE YOU SURE? |
| ⋮ | ⋮ |

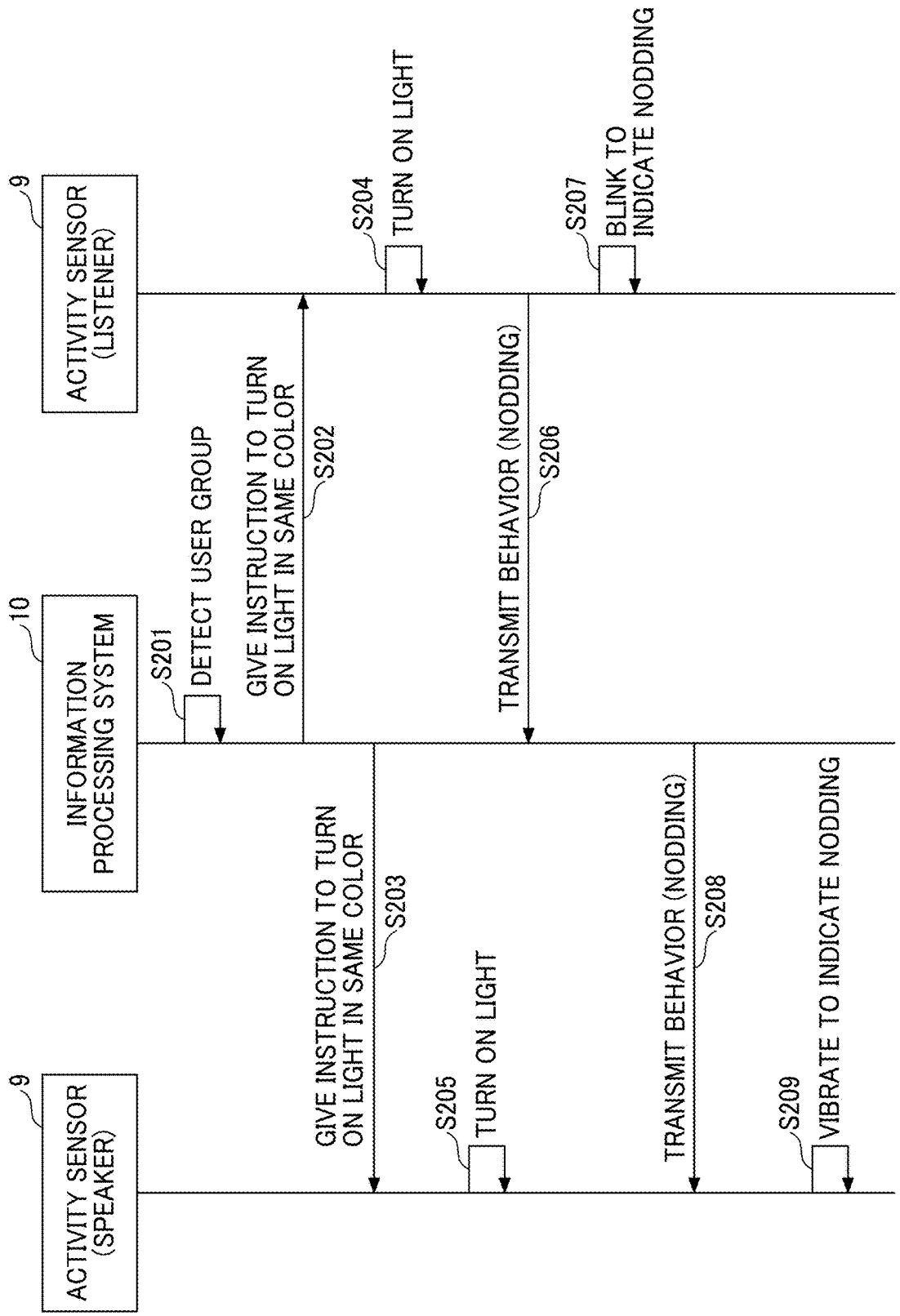

FIG. 20A  FIG. 20B  FIG. 20C
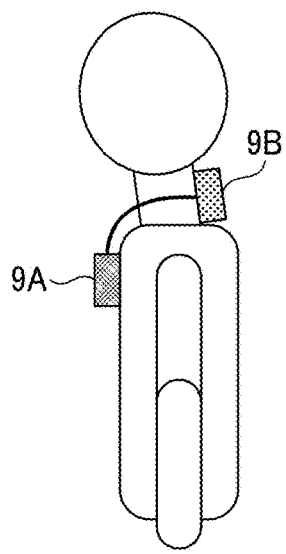
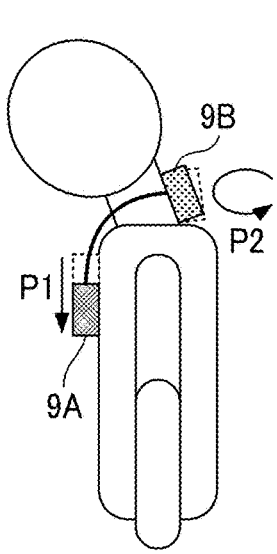
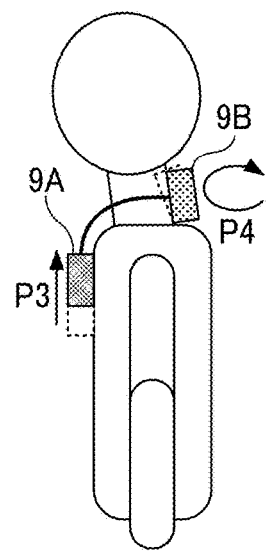
FIG. 21
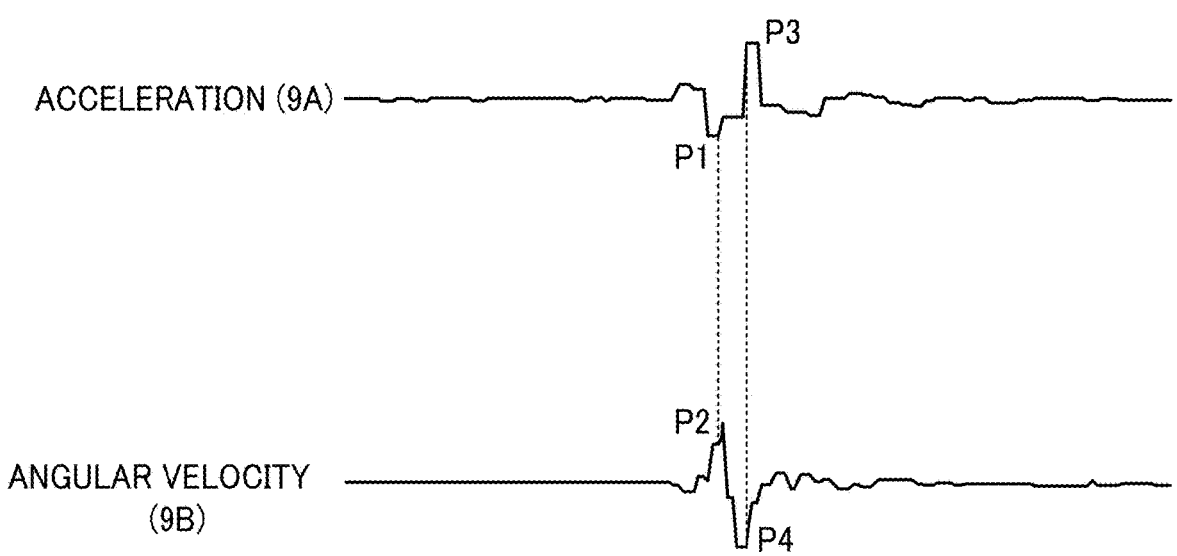

SENSOR DEVICE, NONTRANSITORY RECORDING MEDIUM, AND PRESUMING METHOD

CROSS-REFERENCE TO RELATED APPLICATION

This patent application is based on and claims priority pursuant to 35 U.S.C. § 119(a) to Japanese Patent Application No. 2023-131447, filed on Aug. 10, 2023, in the Japan Patent Office, the entire disclosure of which is hereby incorporated by reference herein.

BACKGROUND

Technical Field

The present disclosure relates to a sensor device, a non-transitory recording medium, and a presuming method.

Related Art

For creative activities and effective communication in offices, for example, the reliability, effectiveness, and psychological safety of employees are important. Specifically, for example, the way of listening is important for effective communication. The listener's behavior such as nodding in response to a speech gives a sense of security to the speaker or represents the level of understanding of the listener.

SUMMARY

According to an embodiment of the present disclosure, a sensor device includes a first inertial sensor that contacts a body of a user, a second inertial sensor that contacts a neck of the user, and circuitry that presumes a behavior of the user based on a first signal detected by the first inertial sensor and a second signal detected by the second inertial sensor.

According to an embodiment of the present disclosure, a non-transitory recording medium stores a plurality of instructions which, when executed by one or more processors, causes the one or more processors to perform a presuming method. The method includes presuming a behavior of a user based on a first signal detected by a first inertial sensor that contacts a body of the user and a second signal detected by a second inertial sensor that contacts a neck of the user.

According to an embodiment of the present disclosure, a presuming method includes presuming a behavior of a user based on a first signal detected by a first inertial sensor that contacts a body of the user and a second signal detected by a second inertial sensor that contacts a neck of the user.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 1A and 1B are perspective views of an example of an activity sensor;

FIG. 6 is a diagram illustrating a hardware configuration of an example of an activity sensor;

FIGS. 8A to 8C are external views of an example of a second activity sensor;

FIG. 11 is a table of an example of activity information;

FIG. 19 is a sequence diagram of an example of a process in which an information processing system notifies a speaker that a listener has nodded;

FIGS. 20A to 20C are schematic diagrams illustrating the movement of the body of a user when the user nods;

FIG. 21 is a chart of an example of changes in the acceleration and angular velocity detected when the body moves as illustrated in FIGS. 20A to 20C;

Figure 2:
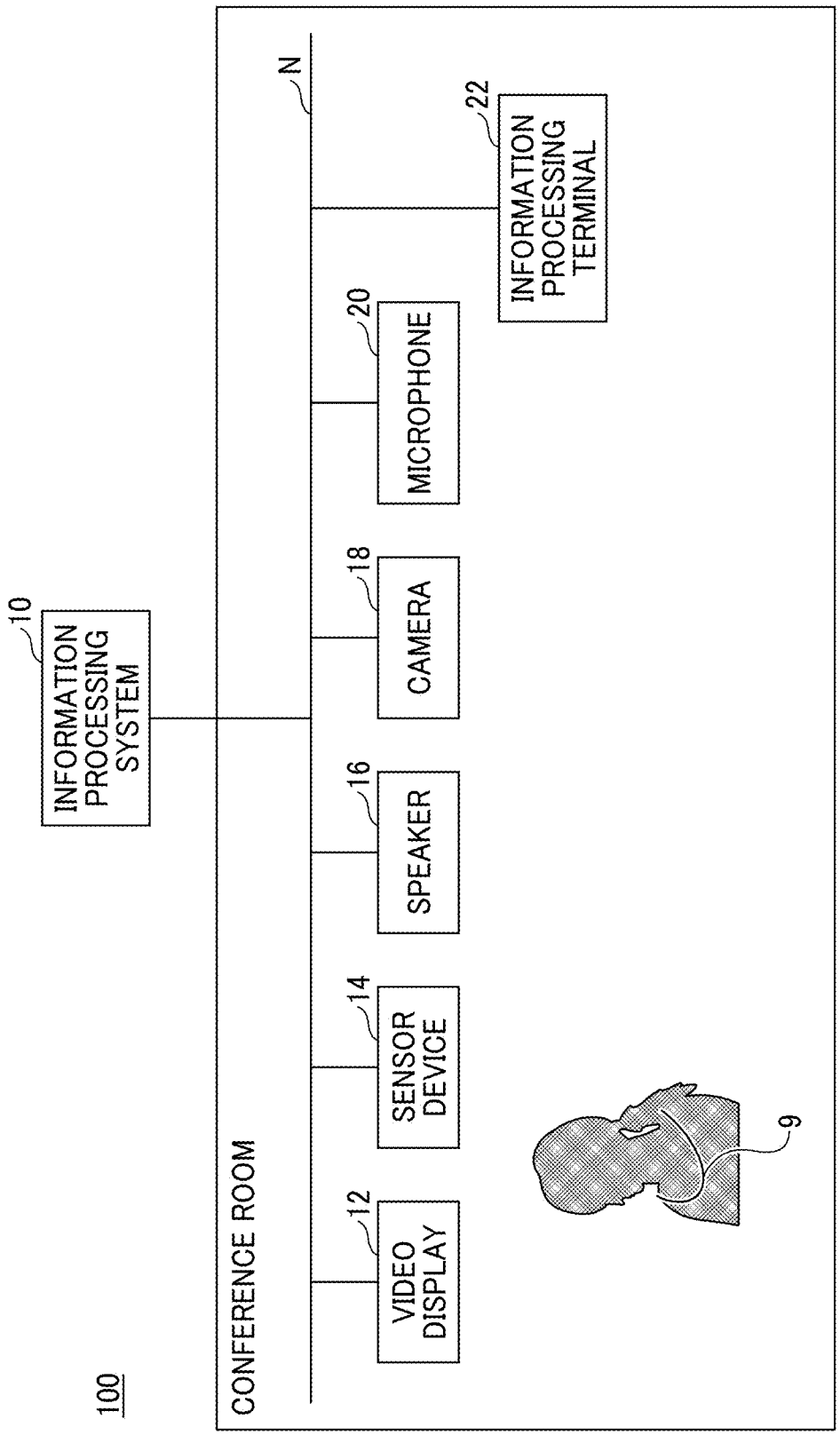
FIG. 2 is a diagram illustrating a configuration of an example of a communication system.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below.

As used herein, the singular forms "a," "an," and "the" are intended to include the plural forms as well, unless the context clearly indicates otherwise. The term "connected/coupled" includes both direct connections and connections in which there are one or more intermediate connecting elements.

For the sake of simplicity, like reference signs denote like elements such as parts and materials having the same functions, and redundant descriptions thereof are omitted unless otherwise required.

Referring to the attached drawings, a description is given below of an activity sensor and a presuming method performed by the activity sensor according to one or more embodiments.

Comparative Technique Related to Detection of Motion

As described above, the way of listening is important for communication. For example, a motion such as nodding in response to the speech gives a positive feeling to the speaker, thus further smoothing communication. Like the way of listening, looking toward the speaker is also important for communication. By contrast, the listener can inform the speaker of the level of understanding by cocking or shaking his or her head. For example, detecting these behaviors with activity sensors and recording the motions of the employees or feeding back to each other based on the detection may promote more detailed communication. As a result, the enhancement of work efficiency and creativity is expected.

There is a technique for capturing, with a camera, an image of a motion of a person in communication and presuming the motion by using an image processing technique or presuming an emotion from a facial expression. However, using a camera has a spatial restriction that a person must be within the field of view of the camera. To detect a motion of a person, an inertial sensor may be attached to the body. Although the spatial restriction is reduced in this case compared to the case in which a camera is used, attaching the inertial sensor to the body is not suitable for long office work because of the need to attach multiple sensors to different places on the body or the need to strap the sensors to the body.

Overview of Activity Sensor According To Present Embodiment

In the present embodiment, various behaviors (motions and postures) of a user are detected by a wearable activity sensor 9, which is easily worn by the user.

FIGS. 1A and 1B are perspective views of the activity sensor 9 according to the present embodiment.

FIG. 1A illustrates an activity sensor 9A that contacts the breast side of the user. The activity sensor 9A is an example of a first inertial sensor. FIG. 1B illustrates an activity sensor 9B that contacts the neck (nape) side of the user. The activity sensor 9B is an example of a second inertial sensor.

In the following description, the activity sensor 9A and the activity sensor 9B are collectively referred to as "activity sensor 9." The activity sensor 9A and the activity sensor 9B are coupled in a circular shape by a string, thus constructing a necklace-shaped activity sensor 9. The activity sensor 9A contacts the body (torso) when the activity sensor 9A is worn. More specifically, the activity sensor 9A hangs down in contact with the chest of the user with the neck as a fulcrum. The activity sensor 9B closely contacts the nape of the user as a fulcrum when the activity sensor 9B is worn. The user simply needs to wear the activity sensor 9 around his or her neck, without tying or sticking the activity sensor 9.

Each of the activity sensor 9A and the activity sensor 9B includes an accelerometer, an angular velocity sensor, and a geomagnetic sensor. The activity sensor 9A acquires, as examples of first signals, signals from the accelerometer, the angular velocity sensor, and the geomagnetic sensor. The activity sensor 9B acquires, as examples of second signals, signals from the accelerometer, the angular velocity sensor, and the geomagnetic sensor. The activity sensor 9 can accurately detect behaviors such as nodding based on the signals detected by the two sensors including the acceleration sensors, the angular velocity sensors, and the geomagnetic sensors disposed at different body parts of the user.

As described above, the activity sensor 9 according to the present embodiment is easily worn by the user because the user simply needs to wear the activity sensor 9 around his or her neck. Since the activity sensor 9 detects the signals of acceleration and angular velocity at different body parts of the user, the activity sensor 9 can detect various motions such as nodding, head shaking, head cocking, and head turning (facial direction) and various postures such as leaning backward and leaning forward.

Terms

The term "behavior" refers to a behavior of a person. The behavior includes any motion or posture. In the present embodiment, the user's act of moving his or her body is referred to as a motion whereas the user's pose of maintaining his or her body for a certain period of time is referred to as a posture. These distinctions may not be strict.

The term "sensor device" refers to a device including one or more sensors to presume the behavior of the user. The sensor device detects, for example, signals of acceleration and angular velocity at different body parts of the user. In the present embodiment, the sensor device is described by the term "activity sensor." The sensor device can be worn by the user. Thus, the sensor device may be referred to as, for example, a wearable sensor or a lifelog sensor.

The term "positional information" refers to information indicating the position of the user in space. The position may be, for example, coordinates based on a reference point in space. In the present embodiment, the positional information is detected by Ultra-wideband (UWB). The position may be a latitude and a longitude detected by, for example, an indoor messaging system (IMES) or a global navigation satellite system (GNSS). In the present embodiment, the positional information may be referred to simply as "position."

The term "inertial sensor" refers to a sensor capable of detecting acceleration and angular velocity. An accelerometer and an angular velocity sensor may be separate sensors.

System Configuration

FIG. 2 is a diagram illustrating a configuration of a communication system 100 as an example of a communication system according to the present embodiment.

Figure 3:
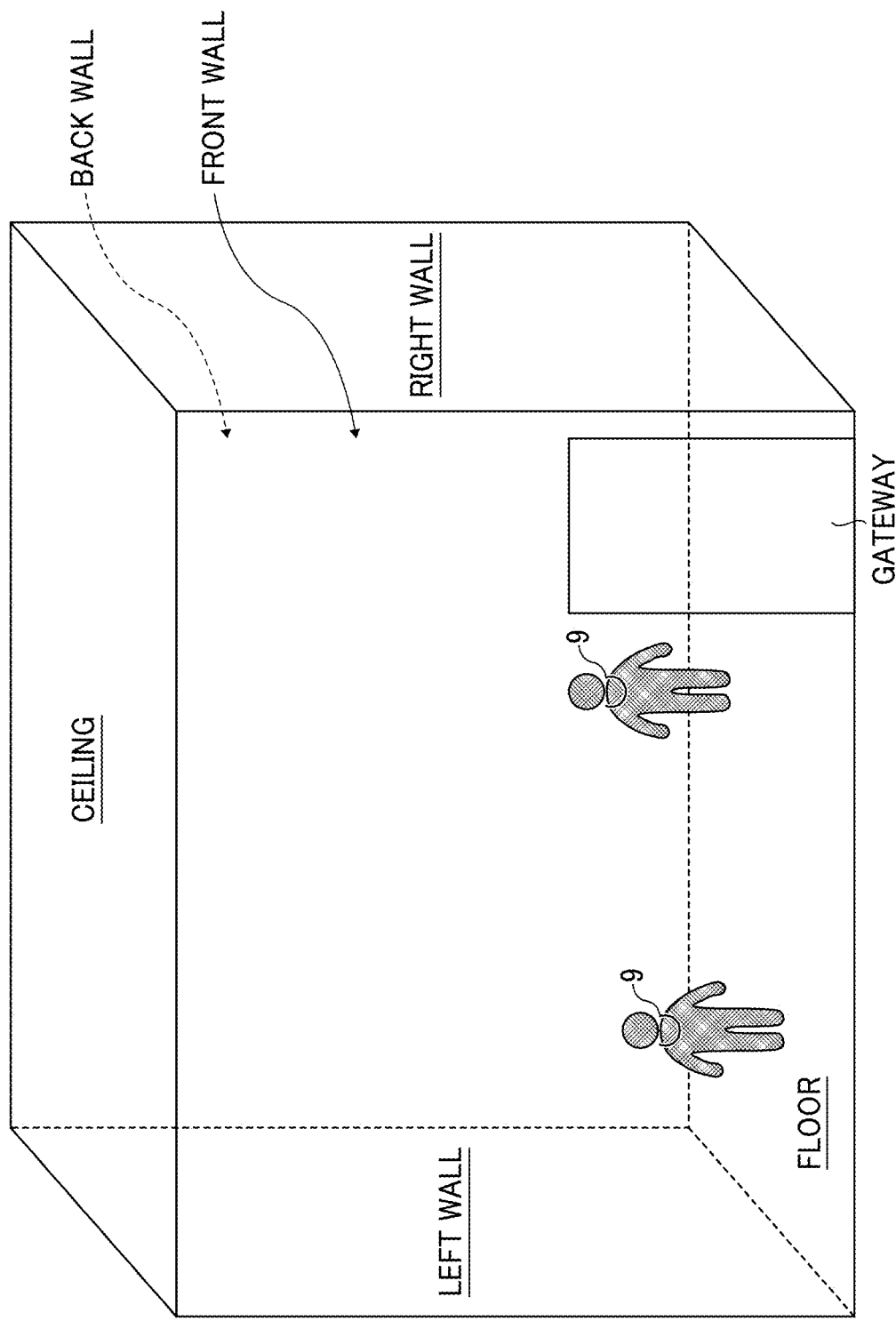
FIG. 3 is a diagram illustrating an example of a conference room.

FIG. 3 is a diagram illustrating an example of a conference room according to the present embodiment.

The communication system 100 illustrated in FIG. 2 includes an information processing system 10, a video display 12, a sensor device 14, a speaker 16, a camera 18, a microphone 20, and an information processing terminal 22, which are communicably connected to each other in a wired or wireless manner through a network N such as the Internet or a local area network (LAN).

In the conference room, one or more video displays 12, one or more sensor devices 14, one or more speakers 16, one or more cameras 18, one or more microphones 20, and one or more information processing terminals 22 are disposed. In addition, sensors such as a temperature sensor, a humidity sensor, and an illuminance sensor may be disposed in the conference room to provide information to the information processing system 10. Although FIG. 2 illustrates an example in which the information processing system 10 is disposed outside the conference room, the information processing system 10 may be disposed inside the conference room.

For example, a user who enters the conference room carries the activity sensor 9 such as a beacon which transmits radio waves. The sensor device 14 in the conference room receives the radio waves transmitted from the activity sensor 9 of the user in the conference room as a signal for detecting the positional information of the user. The sensor device 14 then transmits the signal to the information processing system 10. The sensor device 14 may be a sensor of a positioning system capable of outputting a signal for detecting the positional information of the user.

The activity sensor 9 on the measurement target includes the activity sensors 9A and 9B each including an acceleration/angular-velocity sensor, a geomagnetic sensor, and a vital sensor. The activity sensor 9 is shaped like a necklace so that the user can wear the activity sensor 9 around his or her neck. The activity sensor 9A includes a microphone and can acquire voice of the person who wears the activity sensor 9A. The vital sensor can acquire the vital data of the user.

The activity sensor 9 can presume the behavior of the user based on signals detected by the acceleration/angular-velocity sensors and the geomagnetic sensors of the activity sensors 9A and 9B and relative values thereof.

The activity sensor 9 may be a dedicated sensor, a smart watch, a smartphone, or a BLUETOOTH LOW ENERGY (BLE) sensor. The information processing system 10 detects the positional information of each user in the conference room based on the signal for detecting the positional information of the user transmitted from the one or more sensor devices 14. The activity sensor 9 described above is an example of a transmission device. The activity sensor 9 may be any device that transmits a signal for detecting the positional information of the user.

The information processing terminal 22 is a device operated by the user in the conference room. Examples of the information processing terminal 22 include, but are not limited to, a laptop personal computer (PC), a mobile phone, a smartphone, a tablet terminal, a game console, a personal digital assistant (PDA), a digital camera, a wearable PC, a desktop PC, and a device dedicated to a conference room. The information processing terminal 22 may be carried into the conference room by the user or may be provided in the conference room.

The information processing terminal 22 may be a measurement target subjected to measurement by the positioning system. For example, the sensor device 14 in the conference room may receive radio waves transmitted from the activity sensor 9 of the information processing terminal 22 and transmit the radio waves to the information processing system 10. For example, as illustrated in FIG. 3, the sensor device 14 can transmit to the information processing system 10 a signal for detecting positional information of a user who operates the information processing terminal 22 in the conference room. The activity sensor 9 may be incorporated in the information processing terminal 22 or may be provided in another way. Further, the information processing terminal 22 may be provided with a sensor that measures the heart rate of the user and may notify the information processing system 10 of the measured heart rate of the user.

The camera 18 in the conference room captures an image of the conference room and transmits video data of the captured image to the information processing system 10 as an output signal. For example, a KINECT video camera may be used as the camera 18. The KINECT video camera is an example of a video camera including a range image sensor, an infrared sensor, and an array microphone. When the video camera including the range image sensor, the infrared sensor, and the array microphone is used, the motion and posture of the user can be recognized.

The microphone 20 in the conference room converts the voice of the user into an electric signal. The microphone 20 transmits the electric signal converted from the voice of the user to the information processing system 10 as an output signal. The microphone of the information processing terminal 22 may be used instead of the microphone 20 in the conference room or together with the microphone 20 in the conference room.

The speaker 16 in the conference room converts the electric signal into a physical signal and outputs sound such as an ambient sound. The speaker 16 outputs sound such as an ambient sound under the control of the information processing system 10. The speaker of the information processing terminal 22 may be used instead of the speaker 16 in the conference room or together with the speaker 16 in the conference room. The microphone 20 in the conference room and the microphone of the information processing terminal 22 are examples of input devices. The speaker 16 in the conference room and the speaker of the information processing terminal 22 are examples of output devices.

In addition to the devices illustrated in FIG. 2, for example, a vibration generator that generates vibration by a motor and an odor device that generates odor may be disposed. The vibration generator includes a vibration motor and has a rotary shaft coupled to a weight called a vibrator. The vibrator is designed such that the center of gravity deviates from the portion of the vibrator coupled to the rotary shaft. The vibrator vibrates due to eccentricity when rotated. The vibrator serves as a vibration source as the vibration propagates to the surroundings. The odor device may be of any type, such as an air gun type or a blowing type.

The video display 12, the sensor device 14, the speaker 16, the camera 18, the microphone 20, the information processing terminal 22, the activity sensor 9, the vibration generator, and the odor device may be devices having a combination of two or more of these configurations.

An example of the multiple video displays 12 in the conference room is a projector, which can display images on a face partitioning the conference room as illustrated in FIG. 3 under the control of the information processing system 10. Examples of the faces that partition the conference room include, but are not limited to, a front wall, a back wall, a right wall, a left wall, a floor, and a ceiling. Like the positional information, the position of each wall is specified by coordinates with the contact point of the ends of the walls as a reference (origin). The projector can detect an operation of the user (such as handwriting) on the wall by a known way. An example of the video display 12 is a flat panel display such as a liquid crystal display (LCD) or an organic electroluminescence display (OELD). The flat panel display is preferably a touch panel, and preferably has a large screen. The video display 12 may be an electronic blackboard including a flat panel display. The electronic blackboard may be embedded in the wall or may be disposed in front of the wall. The video display 12 is an example of a display that displays images and may be any display having at least a function of displaying images.

The shape of the conference room illustrated in FIG. 3 is an example and may be another shape. As described above, all the faces of the conference room, such as the walls, the floor, and the ceiling, are not necessarily partitioned. Alternatively, the conference room may be an open conference room having one or more faces not partitioned. The conference room is an example of a common space in which multiple users are present. Examples of the space include, but are not limited to, a room for seminars and lectures, a meeting space, an event space, a children's room, a children's hall, a classroom, a hospital, a game center, and an amusement park. As described above, the space described in the present embodiment is a concept including a place or a room in which multiple users are present.

The information processing system 10 is one or more information processing apparatuses. The information processing system 10 outputs an ambient sound and a video image suitable for exchange between users (interaction such as conversation or conference) in the conference room as described later based on, for example, the positional information of the users detected based on the signal transmitted from the sensor device 14, the output signal from the camera 18, and the output signal from the microphone 20.

The configuration of the information processing system 10 illustrated in FIG. 2 is an example. The information processing system 10 may be implemented by a single computer or multiple computers or may be implemented by using a cloud service. Examples of the information processing system 10 include, but are not limited to, an output device such as a projector, a display having a blackboard function, and a digital signage, a head-up display (HUD), an industrial machine, an image capturing device, a sound collecting device, a medical device, a networked home appliance, an automobile (connected car), a laptop PC, a mobile phone, a smartphone, a tablet terminal, a game console, a personal digital assistant (PDA), a digital camera, a wearable PC, and a desktop PC.

Hardware Configuration

Hardware Configuration of Computer

Figure 4:
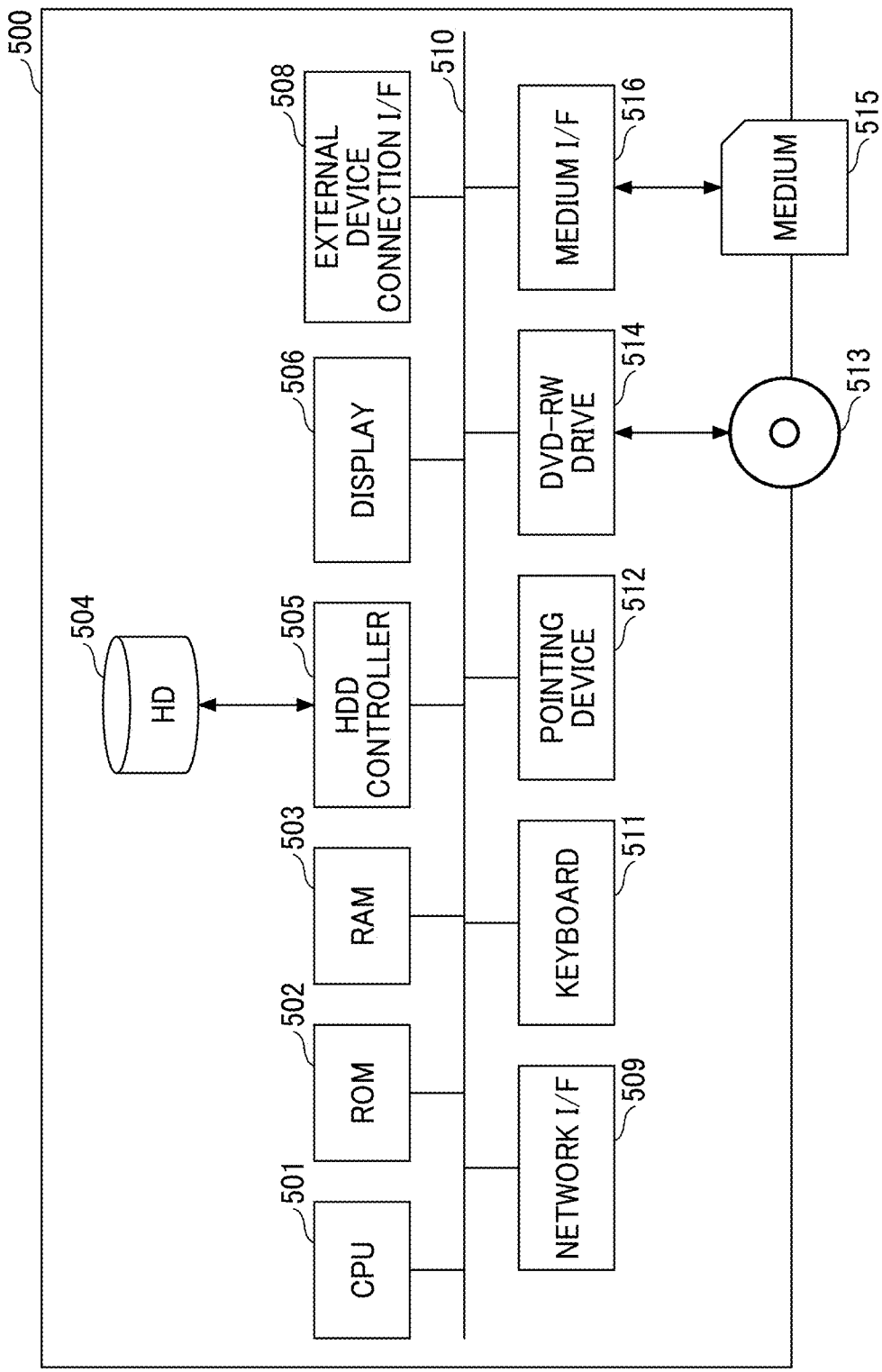
FIG. 4 is a diagram illustrating a hardware configuration of an example of a computer.

The information processing system 10 is implemented by a computer 500 having a hardware configuration illustrated in FIG. 4, for example. When the information processing terminal 22 is a PC, the information processing terminal 22 is implemented by the computer 500 having the hardware configuration illustrated in FIG. 4, for example.

FIG. 4 is a diagram illustrating the hardware configuration of the computer 500 as an example of a computer according to the present embodiment.

As illustrated in FIG. 4, the computer 500 includes a central processing unit (CPU) 501, a read-only memory (ROM) 502, a random-access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a digital versatile disk rewritable (DVD-RW) drive 514, and a medium I/F 516.

The CPU 501 controls the entire operation of the computer 500. The ROM 502 stores programs such as an initial program loader (IPL) to boot the CPU 501. The RAM 503 is used as a work area for the CPU 501. The HD 504 stores various data such as programs. The HDD controller 505 controls the reading or writing of various data from or to the HD 504 under the control of the CPU 501.

The display 506 displays various kinds of information such as a cursor, menu, window, character, and image. The external device connection I/F 508 is an interface that connects the computer 500 to various external devices. Examples of the external devices include, but are not limited to, a universal serial bus (USB) memory and a printer. The network I/F 509 is an interface that enables data communication through the communication network N. Examples of the bus line 510 include, but are not limited to, an address bus and a data bus, which electrically connects the components such as the CPU 501.

The keyboard 511 is an example of input means provided with multiple keys that allows a user to input characters, numerals, or various instructions. The pointing device 512 is an example of input means that allows a user to, for example, select or execute a specific instruction, select a target for processing, or move a cursor being displayed. The DVD-RW drive 514 controls the reading or writing of various data from or to a DVD-RW 513, which is an example of a removable recording medium. The removable recording medium is not limited to the DVD-RW. For example, the removable recording medium may be a DVD-recordable (DVD-R). The medium I/F 516 controls the reading or writing (storing) of data from or to a recording medium 515 such as a flash memory.

Configuration of Smartphone

Figure 5:
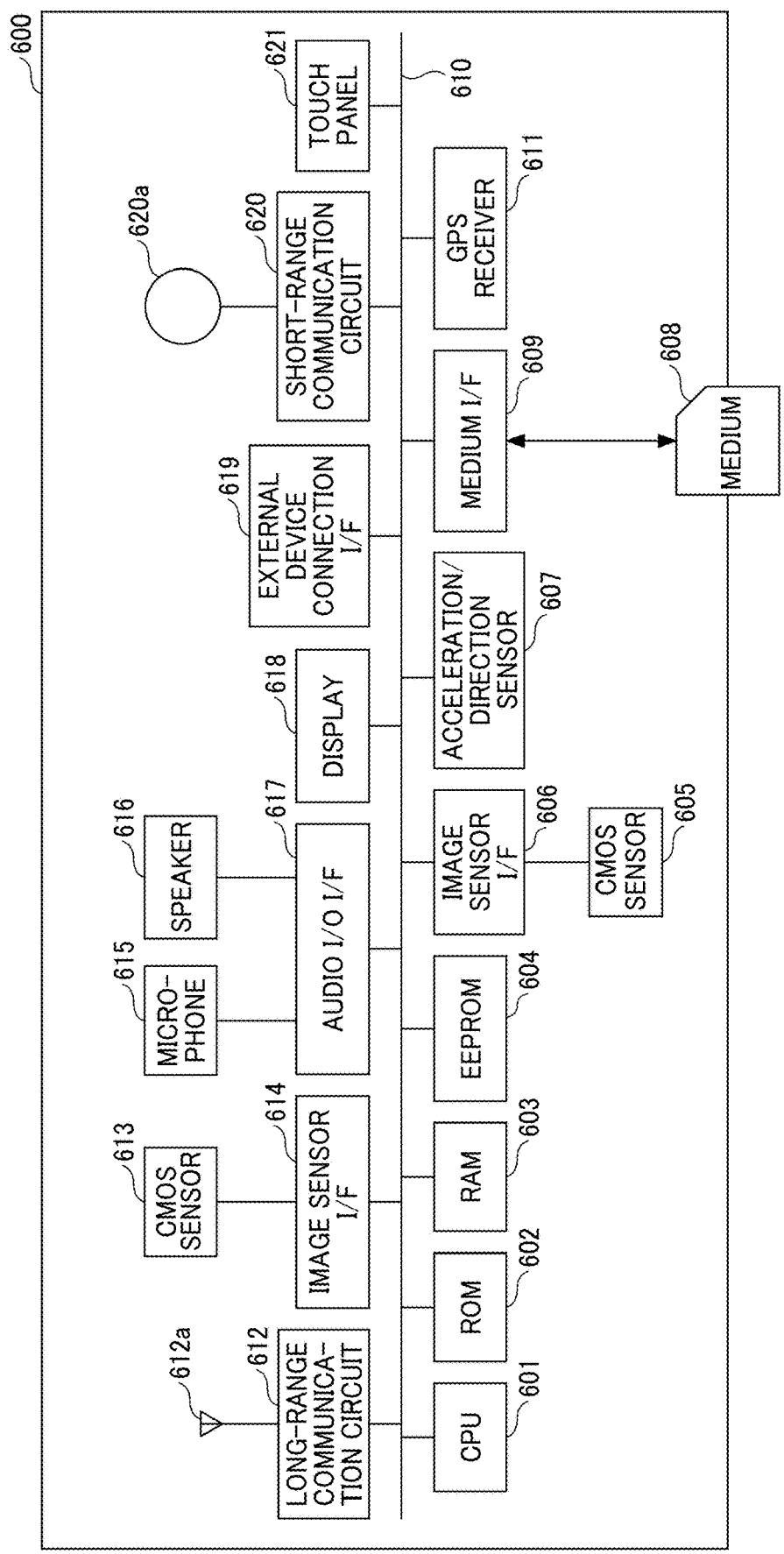
FIG. 5 is a diagram illustrating a hardware configuration of an example of an information processing terminal.

The information processing terminal 22 may be implemented by a smartphone 600 having the hardware configuration illustrated in FIG. 5, for example. In a case where the information processing terminal 22 is, for example, a laptop PC, a mobile phone, a smartphone, a tablet terminal, a game console, a PDA, a digital camera, a wearable PC, a desktop PC, or a device dedicated to a conference room, the information processing terminal 22 may be implemented by a hardware configuration substantially the same as the hardware configuration illustrated in FIG. 5. A part of the hardware configuration illustrated in FIG. 5 may be omitted, or the hardware configuration illustrated in FIG. 5 may be provided with additional configurations.

FIG. 5 is a diagram illustrating the hardware configuration of the smartphone 600 as an example of a smartphone according to the present embodiment.

As illustrated in FIG. 5, the smartphone 600 includes a CPU 601, a ROM 602, a RAM 603, an electrically erasable programmable read-only memory (EEPROM) 604, a complementary metal oxide semiconductor (CMOS) sensor 605, an image sensor I/F 606, an acceleration/direction sensor 607, a medium I/F 609, and a Global Positioning System (GPS) receiver 611.

The CPU 601 controls the entire operation of the smartphone 600. The ROM 602 stores programs such as an IPL to boot the CPU 601. The RAM 603 is used as a work area for the CPU 601. The EEPROM 604 reads or writes various data such as a program for a smartphone under the control of the CPU 601.

The CMOS sensor 605 is an example of built-in image capturing means that captures an image of a subject such as a self-portrait under the control of the CPU 601 to acquire image data. The CMOS sensor 605 may be image capturing means such as a charge-coupled device (CCD) sensor. The image sensor I/F 606 is a circuit that controls the driving of the CMOS sensor 605. The acceleration/direction sensor 607 includes various sensors such as an electromagnetic compass or a gyrocompass for detecting geomagnetism and an acceleration sensor.

The medium I/F 609 controls the reading or writing (storing) of data from or to a recording medium 608 such as a flash memory. The GPS receiver 611 receives a GPS signal from a GPS satellite.

The smartphone 600 further includes a long-range communication circuit 612, an antenna 612a of the long-range communication circuit 612, a CMOS sensor 613, an image sensor I/F 614, a microphone 615, a speaker 616, an audio input/output (I/O) I/F 617, a display 618, an external device connection I/F 619, a short-range communication circuit 620, an antenna 620a of the short-range communication circuit 620, and a touch panel 621.

The long-range communication circuit 612 is a circuit that enables the smartphone 600 to communicate with other devices through the network N. The CMOS sensor 613 is an example of the built-in image capturing means that captures an image of a subject under the control of the CPU 601 to acquire image data. The image sensor I/F 614 is a circuit that controls the driving of the CMOS sensor 613. The microphone 615 is a built-in circuit that converts voice or sound into an electric signal. The speaker 616 is a built-in circuit that converts an electric signal into physical vibration to produce sound such as an ambient sound, music, or voice.

The audio I/O I/F 617 is a circuit that inputs an audio signal from the microphone 615 or outputs an audio signal to the speaker 616 under the control of the CPU 601. The display 618 is an example of display means that displays, for example, an image of a subject and various icons. Examples of the display means include, but are not limited to, an LCD and an OEL.

The external device connection I/F 619 is an interface that connects the smartphone 600 to various external devices. The short-range communication circuit 620 is a communication circuit that communicates in compliance with the near-field communication (NFC) or the BLUETOOTH. The touch panel 621 is an example of input means that allows a user to operate the smartphone 600 by touching a screen of the display 618.

The smartphone 600 further includes a bus line 610. Examples of the bus line 610 include, but are not limited to, an address bus and a data bus, which electrically connects the components illustrated in FIG. 5 such as the CPU 601.

Configuration of Activity Sensor 9

FIG. 6 is a diagram illustrating the hardware configuration of the activity sensor 9 as an example of an activity sensor according to the present embodiment.

As illustrated in FIG. 6, the activity sensor 9 includes the activity sensor 9A and the activity sensor 9B. The activity sensor 9A includes a microcomputer 701, a microphone 702, a UWB module 703, a vital sensor 704, an acceleration/angular-velocity sensor 705, a geomagnetic sensor 706, a communication I/F 707, and a light emitting diode (LED) light 708.

The microcomputer 701 has a series of functions of a typical computer, such as a CPU, a ROM, a RAM, and an EEPROM. The microphone 702 is a built-in circuit that converts voice or sound into an electric signal. The UWB module 703 periodically transmits a short and sharp rectangular radio wave (pulse). Although the communication range is as short as about 10 meters, high-speed communication can be performed with low power consumption. The sensor device 14 can detect the direction and distance of the activity sensor 9 with high accuracy within a range of error of about several centimeters by receiving the rectangular radio wave (pulse).

The vital sensor 704 detects the vital data of the user. The vital data refers to an index such as a heart rate, a pulse, or a blood pressure indicating that a person is alive. The acceleration/angular-velocity sensor 705 is also referred to as an inertial sensor. The acceleration/angular-velocity sensor 705 detects the accelerations in three axial directions and the angular velocities of the rotations about three axes of the user. The microcomputer 701 can presume the direction of the user by, for example, integrating the angular velocity. The geomagnetic sensor 706 is a sensor that detects the magnetic force of the earth. The geomagnetic sensor 706 detects the direction of north, south, east, and west (more specifically, an angle of from 0° to 360°) in which the user faces. The geomagnetic sensor 706 is also called an electronic compass.

The communication I/F 707 is connected to a network through a wireless local area network (LAN) or the BLUETOOTH to transmit, for example, a sensor signal detected by the activity sensor 9 to the sensor device 14 or the information process system 10. The LED light 708 can be turned on with various combinations of a light color and a blinking pattern. The LED light 708 outputs, for example, the information of which the activity sensor 9A is notified from the information process system 10 and a detected behavior.

The activity sensor 9B includes a vital sensor 711, an acceleration/angular-velocity sensor 712, a geomagnetic sensor 713, and a vibration motor 714. These functions may be substantially the same as those of the activity sensor 9A. The vibration motor 714 vibrates by energization and transmits information to the user by tactile sense. The activity sensors 9A and 9B may further include a speaker, an odor device that generates odor, and a camera.

Since the activity sensor 9B is coupled to the activity sensor 9A by a serial cable 715, the signals detected by the sensors of the activity sensor 9B are transmitted to the activity sensor 9A in real time. The activity sensor 9B is supplied with power from a battery 709 included in the activity sensor 9A.

The microcomputer 701 can presume the behavior of the user based on two accelerations detected by the acceleration/angular-velocity sensor 705 of the activity sensor 9A and the acceleration/angular-velocity sensor 712 of the activity sensor 9B. The microcomputer 701 can presume the behavior of the user based on the acceleration detected by the acceleration/angular-velocity sensor 705 of the activity sensor 9A and the angular velocity detected by the acceleration/angular-velocity sensor 705 of the activity sensor 9B.

External View of Activity Sensor 9

Figure 7A:
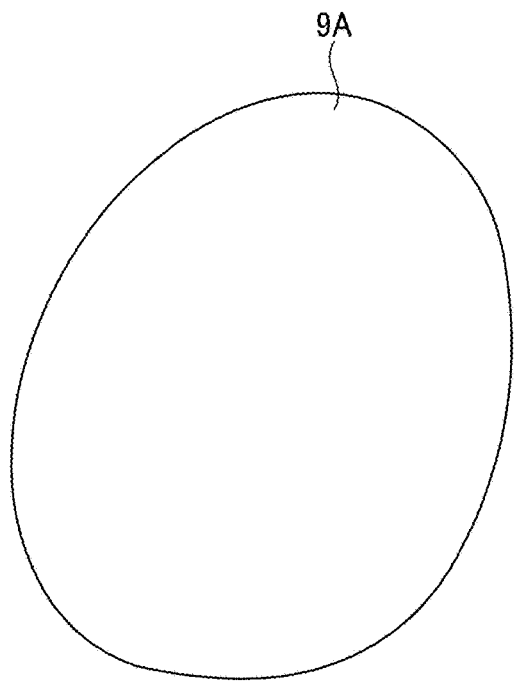
FIGS. 7A and 7B are external views of an example of a first activity sensor.
Figure 7B:
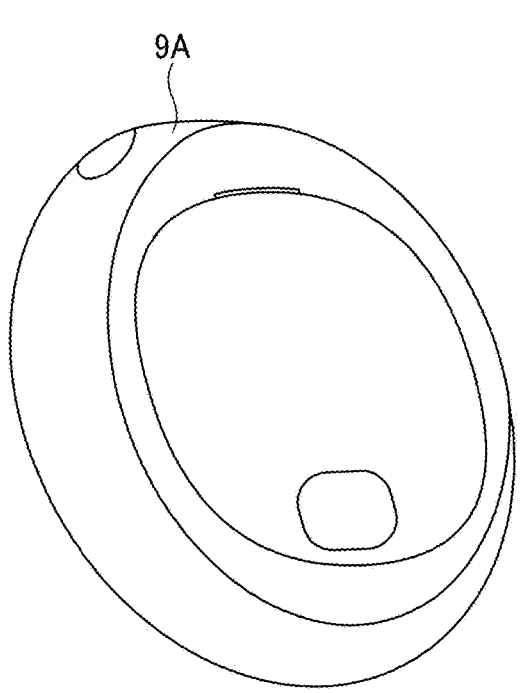

FIGS. 7A and 7B are external views of the activity sensor 9A.

FIGS. 8A to 8C are external views of the activity sensor 9B.

The activity sensor 9A and the activity sensor 9B are electrically connected to each other through a serial cable such as a USB cable. Since the serial cable is covered with a string, the user is less likely to be conscious of the serial cable. The activity sensor 9B has an end with a serial-cable insertion port. The user can wear the activity sensor 9 by connecting an end of the string to the insertion port, like wearing a typical necklace.

FIG. 7A is a front view of the activity sensor 9A. FIG. 7B is a back view of the activity sensor 9A.

The shape of the activity sensor 9A having a curved front face and a flat back face like a natural stone helps the user to correctly wear the activity sensor 9A. The shape of the activity sensor 9A differs depending on individuals, thus preventing a decrease in the individuality of the user who wears the activity sensor 9A.

FIG. 8A is a front view of the activity sensor 9B. FIG. 8B is a back view of the activity sensor 9B. FIG. 8C is a side view of the activity sensor 9C.

As illustrated in FIG. 8C, the activity sensor 9C has faces each having an opening through which the string passes and each inclined toward the back face of the activity sensor 9B so that the exit of the string is not easily seen. The activity sensor 9B is several centimeters outside the center of the back of the neck so that the back face of the activity sensor 9B closely contacts the nape of the neck.

Further, a dummy having substantially the same shape as the activity sensor 9B is positioned such that the dummy and the activity sensor 9B are symmetrical with respect to the center of the back of the neck of the user. Such symmetrical positioning of the activity sensor 9B and the dummy in substantially the same shape allows the string between the activity sensor 9B and the dummy to be curved and maintain the activity sensor 9B in close contact with the neck when the user moves and the portion of the activity sensor 9B in contact with the neck changes. The activity sensor 9B and the dummy present an excellent aesthetic appearance.

Figure 9B:
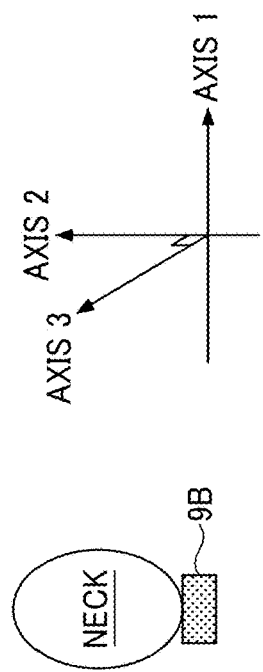
FIGS. 9A to 9D are top views of examples of activity sensors worn by a user.
Figure 9D:
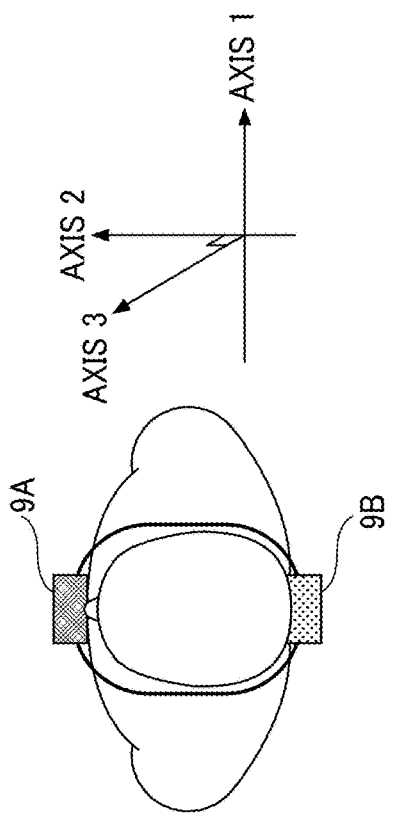
Figure 9A:
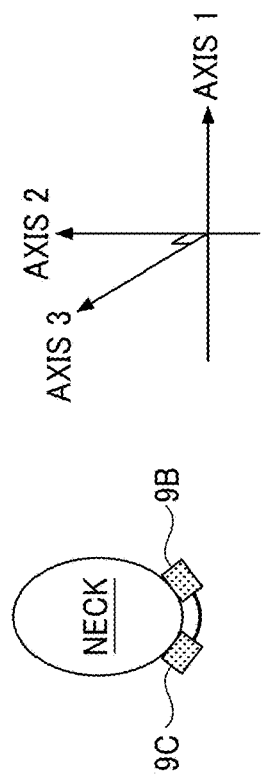

FIG. 9A is a top view of the activity sensors 9A and 9B and a dummy 9C worn by the user.

As illustrated in FIG. 9A, the activity sensor 9B and the dummy 9C in substantially the same shape are symmetrical with respect to the center of the back of the neck of the user. Although FIG. 9A illustrates the dummy 9C on the left side, the dummy 9C may be on the right side. The dummy 9C includes no sensor.

The position at which the activity sensor 9B and the dummy 9C are in close contact with the user changes due to the movement of the head. For example, in FIG. 9B, the activity sensor 9B and the dummy 9C are moved to a narrow portion of the neck. The activity sensor 9B and the dummy 9C are always fitted to the neck due to the curvature of the string between the activity sensor 9B and the dummy 9C. Such a configuration maintains a contact area between the activity sensor 9 and the skin of the user and enhances the measurement stability of the vital sensor.

Figure 9C:
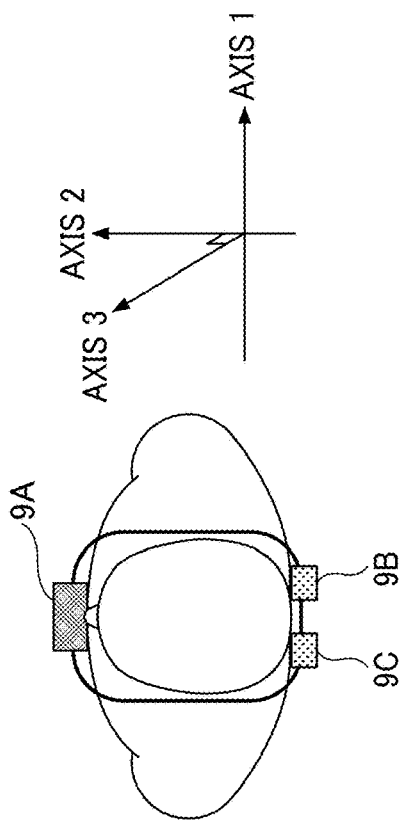

The dummy 9C may be omitted as illustrated in FIGS. 9C and 9D. In this case, the activity sensor 9B is positioned at the center of the back of the neck. An adhesive material may be used on the back face of the activity sensor 9B.

For the sake of simplicity, in the following description, an axis passing through the user (the activity sensors 9A and 9B) in the lateral direction is referred to as an axis 1, an axis passing through the user (the activity sensors 9A and 9B) in the front-back direction is referred to as an axis 2, and an axis passing through the user (the activity sensors 9A and 9B) in the vertical direction is referred to as an axis 3. The acceleration/angular-velocity sensors 705 and 712 detect the angular velocities of the rotations about the axes 1 to 3.

Functional Configuration

Figure 10:
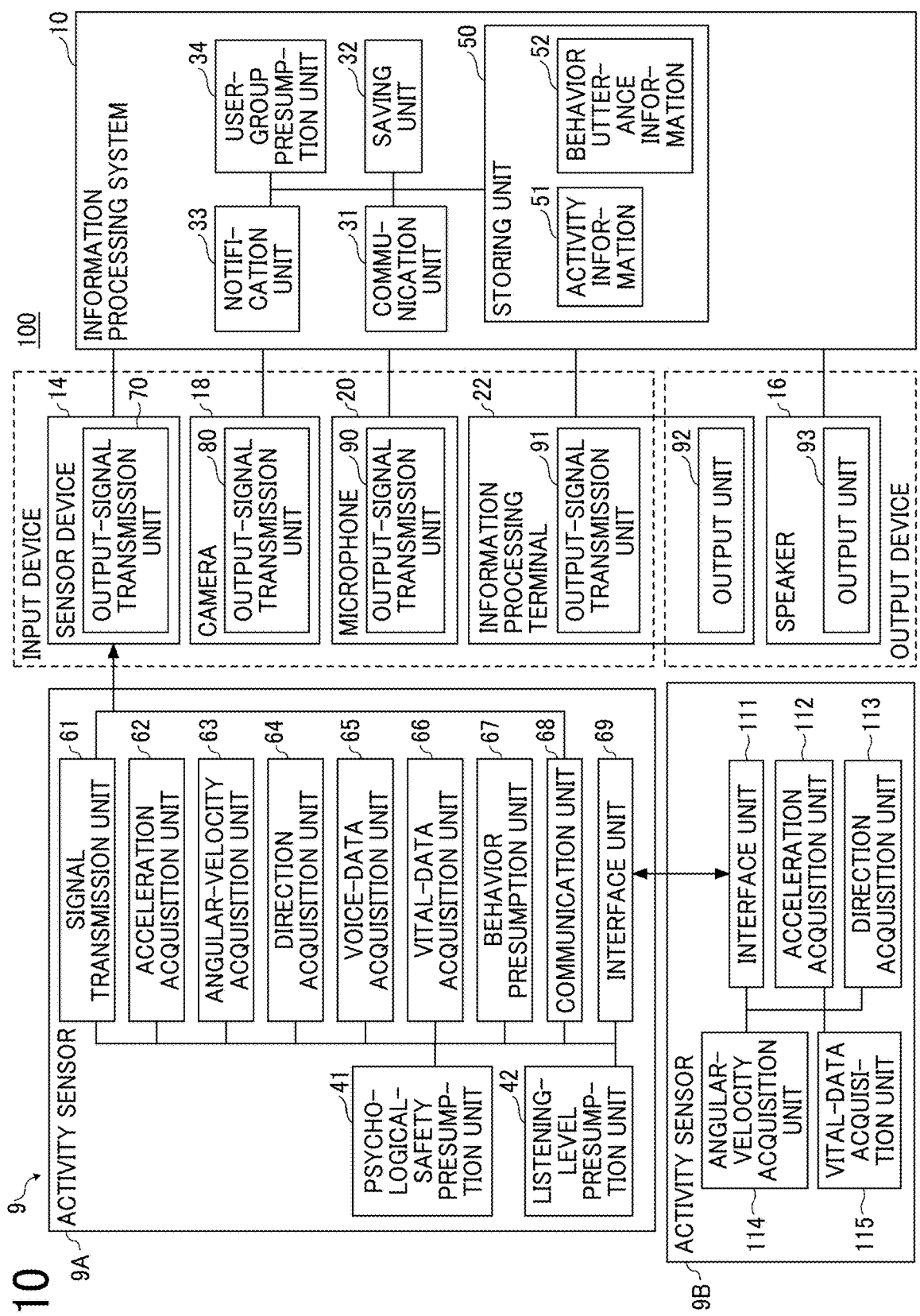
FIG. 10 is a functional block diagram of an example of a communication system including an information processing system and an activity sensor.

The communication system 100 according to the present embodiment is implemented by the functional configuration as illustrated in FIG. 10, for example.

FIG. 10 is a functional block diagram of the communication system 100 including the information processing system 10 and the activity sensor 9 (the activity sensors 9A and 9B) as an example of a communication system according to the present embodiment.

In the functional configuration illustrated in FIG. 10, one or more functions unnecessary for the description of the present embodiment are omitted as appropriate.

Functional Configuration of Activity Sensor 9

The activity sensor 9A includes a signal transmission unit 61, an acceleration acquisition unit 62, an angular-velocity acquisition unit 63, a direction acquisition unit 64, a voice-data acquisition unit 65, a vital-data acquisition unit 66, a behavior presumption unit 67, a communication unit 68, an interface unit 69, a psychological-safety presumption unit 41, and a listening-level presumption unit 42. These functional units of the activity sensor 9A are functions or means implemented by the microcomputer 701 illustrated in FIG. 6 executing commands included in one or more programs installed in the activity sensor 9A. Alternatively, some or all of the functions may be implemented by a hardware circuit such as an application-specific integrated circuit (ASIC).

The signal transmission unit 61 periodically transmits a signal to the sensor device 14 by a radio wave called UWB. Since the signal includes a user identification (ID), the sensor device 14 can detect the position while identifying the user. The positional information of the user is two-dimensional coordinates (x, y) with a predetermined position in the conference room as the origin. For example, the positional information of the user is specified by the coordinates with a contact point between the ends of walls of the conference room or the center of the conference room as the origin.

The acceleration acquisition unit 62 acquires the acceleration along each of the three axes of the activity sensor 9A and detected by the acceleration/angular-velocity sensor 705. The angular-velocity acquisition unit 63 acquires the angular velocity detected by the acceleration/angular-velocity sensor 705 when the activity sensor 9A rotates about each of the three axes. The direction acquisition unit 64 acquires the direction in which the activity sensor 9A faces in a range of from 0° to 360° with respect to, for example, the north direction detected by the geomagnetic sensor 706.

The voice-data acquisition unit 65 acquires voice data by converting voice acquired by a microphone into a digital signal by, for example, pulse-code modulation (PCM). The voice data is transmitted to the information processing system 10. The information processing system 10 performs voice recognition on the voice data to convert the voice data into utterance data (text data). The information processing system 10 transmits the utterance data to the activity sensor 9A. The activity sensor 9A may internally converts the voice data to the utterance data.

The vital-data acquisition unit 66 acquires the vital data detected by the vital sensor 704. Examples of the vital data include, but are not limited to, a heart rate, a pulse, a blood pressure (top and bottom), a body temperature, a saturated oxygen concentration, a perspiration amount, and a subjective symptom (consciousness level). The vital data may include any information that can be detected from the user.

The behavior presumption unit 67 presumes the behavior (motion and posture) of the user based on the acceleration and angular velocity detected by the activity sensor 9A and the acceleration and angular velocity detected by the activity sensor 9B. Examples of the motion include, but are not limited to, nodding, head cocking, and head shaking. Examples of the posture include, but are not limited to, leaning backward, leaning forward, and stooping. A description of how to detect the behavior is deferred. The behavior presumption unit 67 can presume a facial direction based on the direction. The information processing system 10 may include the behavior presumption unit 67. The information processing system 10 presumes the behavior based on, for example, the accelerations, angular velocities, and directions of the chest and the neck transmitted from the activity sensor 9A.

The behavior presumption unit 67 may presume the behavior by machine learning. In this case, the correspondence between the behavior and the signals of, for example, the acceleration, the angular velocity, and the direction is acquired in advance by machine learning. In other words, the behavior presumption unit 67 outputs a behavior corresponding to one or more of the acceleration, the angular velocity, and the direction.

The machine learning is a technique for causing a computer to acquire human-like learning capability and refers to a technique in which a computer autonomously generates an algorithm necessary for determination of, for example, data identification from learning data imported in advance, and applies the algorithm to new data to perform prediction. Any suitable learning method is applied for machine learning, for example, any one of supervised learning, unsupervised learning, semi-supervised learning, reinforcement learning, and deep learning, or a combination of two or more of those learning. Examples of machine learning methods include perceptron, deep learning, support vector machine, logistic regression, naïve Bayes, decision tree, and random forest, but are not limited to the methods described in the present disclosure.

For example, deep learning is an algorithm that adjusts, after predicting an output value based on input data, weights between neural networks by backpropagation to reduce an error between the predicted output value and teacher data. The gradient boosting decision tree is an algorithm that causes multiple weak classifiers to independently learn by a gradient method, integrates the results of prediction performed by the weak classifiers by, for example, majority decision or averaging, and outputs the integrated result of prediction as an entire result of prediction (of the strong classifier).

The communication unit 68 transmits the positional information, the direction, the behavior information related to the behavior presumed by the behavior presumption unit 67, the vital data acquired by the vital-data acquisition unit 66, and the voice data acquired by the voice-data acquisition unit 65 to the sensor device 14 or the information processing system 10.

The interface unit 69 enables the activity sensor 9A to communicate with an interface unit 111 of the activity sensor 9B so that the activity sensor 9A can receive signals from the activity sensor 9B. The interface unit 69 supplies power to the activity sensor 9B.

The listening-level presumption unit 42 presumes the listening level of multiple users determined as a group of users, based on the facial directions of the users. The information processing system 10 may include the listening-level presumption unit 42. The information processing system 10 notifies the activity sensor 9A whether the users are determined as a group of users.

The psychological-safety presumption unit 41 presumes the psychological safety according to the vital data of the multiple users determined as a group of users. The time during which the multiple users face each other may also be considered. The information processing system 10 may include the psychological-safety presumption unit 41.

On the other hand, the activity sensor 9B includes the interface unit 111, an acceleration acquisition unit 112, a direction acquisition unit 113, an angular-velocity acquisition unit 114, and a vital-data acquisition unit 115. These functions may be substantially the same as those of the activity sensor 9A.

Functional Configuration of Input Device and Output Device

The sensor device 14 includes an output-signal transmission unit 70. The camera 18 includes an output-signal transmission unit 80. The microphone 20 includes an output-signal transmission unit 90. The information processing terminal 22 includes an output-signal transmission unit 91 and an output unit 92. The speaker 16 includes an output unit 93.

The output-signal transmission unit 70 of the sensor device 14 transmits the information received from the activity sensor 9 to the information processing system 10. In other words, the output-signal transmission unit 70 transmits the positional information of the multiple users in the conference room to the information processing system 10 together with the user IDs. The sensor device 14 also transmits the information or data received from the activity sensor 9 such as the direction, the behavior information, the utterance data converted from the voice data, and the vital data to the information processing system 10.

The output-signal transmission unit 80 of the camera 18 transmits an image-capturing result obtained by capturing an image of the inside of the conference room to the information processing system 10. The output-signal transmission unit 90 of the microphone 20 transmits electric signals converted from the voices of the multiple users in the conference room to the information processing system 10.

The output-signal transmission unit 91 of the information processing terminal 22 transmits an electric signal converted by the microphone 615 from the voice of the user operating the information processing terminal 22 to the information processing system 10.

The output unit 92 of the information processing terminal 22 outputs sound such as an ambient sound based on the sound data received from the information processing system 10. The output unit 93 of the speaker 16 outputs sound such as an ambient sound based on the sound data received from the information processing system 10.

The output-signal transmission units 70, 80, 90, and 91 illustrated in FIG. 10 are examples of input devices. The output units 92 and 93 are examples of output devices.

Functional Configuration of Information Processing System

The information processing system 10 includes a communication unit 31, a saving unit 32, a notification unit 33, a user-group presumption unit 34, and a storing unit 50. The storing unit 50 stores activity information 51 and behavior utterance information 52. These functional units of the information process system 10 are functions or means implemented by the CPU 501 illustrated in FIG. 4 executing commands included in one or more programs installed in the information process system 10. The storing unit 50 is implemented by, for example, the RAM 503 or the HD 504 illustrated in FIG. 4.

The communication unit 31 of the information processing system 10 receives, for example, the positional information, the direction detected by the activity sensor 9, the behavior information, the utterance data converted from the voice data, and the vital data from the output-signal transmission unit 70 of the sensor device 14. The communication unit 31 receives the image-capturing result from the output-signal transmission unit 80 of the camera 18. The communication unit 31 receives the electric signals converted from the voices of the multiple users in the conference room from the output-signal transmission unit 90 of the microphone 20. The communication unit 31 receives the electric signal converted by the microphone 615 from the voice of the user operating the information processing terminal 22 from the output-signal transmission unit 91 of the information processing terminal 22. The communication unit 31 receives an operation signal that the information processing terminal 22 has received from the user.

The saving unit 32 saves, as the activity information 51, the information or data received by the communication unit 31 such as the positional information, the direction detected by the activity sensor 9, the behavior information, the utterance data converted from the voice data, and the vital data.

The notification unit 33 notifies the activity sensor 9A that users are presumed to belong to a user group.

The notification unit 33 notifies one (first user) of the users presumed to belong to the user group of the behavior of another one (second user) of the users presumed to belong to the user group. For example, the notification unit 33 notifies the first user that the second user has nodded.

The user-group presumption unit 34 presumes a group of two or more users based on the positional information and direction of each user. The user-group presumption unit 34 identifies two or more users facing each other or talking face-to-face and presumes that these users are in a group.

Figures 12, 13:
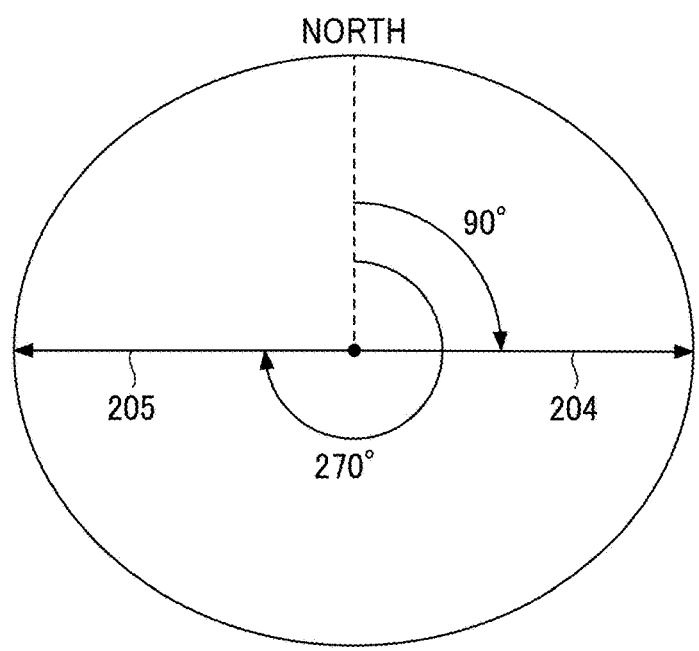
FIG. 12 is a table of an example of behavior utterance information.
FIG. 13 is a diagram illustrating the direction of a user.

The storing unit 50 stores the activity information 51 and the behavior utterance information 52 as illustrated in FIGS. 11 and 12, for example, in a table format. The activity information 51 and the behavior utterance information 52 are not necessarily stored in the table format illustrated in FIGS. 11 and 12. The activity information 51 and the behavior utterance information 52 may be stored in any format. The storing unit 50 may store information like the activity information 51 and the behavior utterance information 52.

FIG. 11 is a table of the activity information 51 as an example of activity information.

The activity information 51 of FIG. 11 includes, as fields, time, positional information, direction, behavior, posture, heart rate, utterance data, reinforcement, psychological safety, and listening level.

The time field indicates Japanese Standard Time on the date. For example, the activity sensor 9A transmits the behavior information every second. Thus, the behavior information is recorded every second. One second is an example and may be automatically changed depending on, for example, the remaining battery charge.

The position (coordinates) of the user detected by the communication between the UWB module 703 and the sensor device 14 is stored in the positional information field.

The direction in which the user faces is stored in the direction field. The angle in the horizontal direction is stored in the direction field in FIG. 11. However, the angle in the latitude direction (vertical direction) obtained by integrating the angular velocity of the rotation of the neck about the axis 1 may also be detected.

The behavior field indicates the behavior taken by the user. The behavior information presumed by the behavior presumption unit 67 is stored in the behavior field.

The heart rate field indicates one of the vital data. The heart rate of the user is stored in the heart rate field. For example, the heart rate may be obtained by converting a value detected in about 10 seconds in the past into a value per minute.

The text data converted from the voice data uttered by the user is stored in the utterance data field.

The reinforcement field indicates whether the detected behavior is reinforced by the utterance data. A detailed description thereof will be given later with reference to FIG. 12.

The psychological safety field indicates psychological safety detected based on the vital data (heart rate) during communication within the group, for example.

The listening level field indicates the listening level detected based on the facial direction of the user during communication within the group, for example.

FIG. 12 is a table of the behavior utterance information 52 as an example of behavior utterance information.

The behavior utterance information 52 is information associating the type of behavior with utterance data that reinforces the behavior. Since the activity sensor 9A including the microphone 702 is located on the chest, the activity sensor 9A can acquire the utterance with high sensitivity. For example, when the user murmurs "yeah" at the same time as nodding, the microphone 702 located near the mouth allows the activity sensor 9A to acquire a small voice at the same time as acquisition of the behavior.

Positive utterance data such as "yeah" reinforces the positive behavior of nodding. The behavior utterance information 52 is downloaded to the activity sensor 9A. When the behavior is associated with the utterance data in the behavior utterance information 52, the behavior presumption unit 67 records, in the activity information 51, that the behavior of nodding is (likely to be) reinforced. The behavior presumption unit 67 may record the degree of reinforcement in consideration of the utterance data and the sound volume. The behavior presumption unit 67 records "Y," which indicates that the behavior is reinforced, and behavior strengths 1, 2, or 3 depending on whether the volume is greater than a threshold. For example, the strength 1 indicates that the behavior is not reinforced, the strength 2 indicates that the behavior is reinforced while the volume is equal to or less than the threshold, and the strength 3 indicates that the behavior is reinforced while the volume is greater than the threshold.

Similarly, a negative behavior such as "head cocking" is associated with negative utterance data such as "Hmm" in the behavior utterance information 52. Utterance data indicating a question such as "are you sure?" is associated with a behavior indicating a question such as "head shaking."

Instead of the behavior presumption unit 67, the information processing system 10 may determine whether the behavior is reinforced or the degree of reinforcement. Since the information process system 10 receives the utterance data together with the behavior from the activity sensor 9A, the saving unit 32 can determine whether the behavior is reinforced or the degree of reinforcement by referring to the behavior utterance information 52.

Determination of Direction and Group

Referring to FIG. 13, a description is given below of the direction of a user.

FIG. 13 is a diagram illustrating the direction of a user.

In FIG. 13, the direction is indicated as an angle in a clockwise direction from the north, for example. Thus, a direction 204 is 90° and a direction 205 is 270°. When the direction reaches 360°, the direction returns to 0°. The direction varies in a range of from 0° to 360°. Although FIG. 13 illustrates the direction in the horizontal direction, the direction of the user in the elevation angle direction is also detected.

Figure 14A:
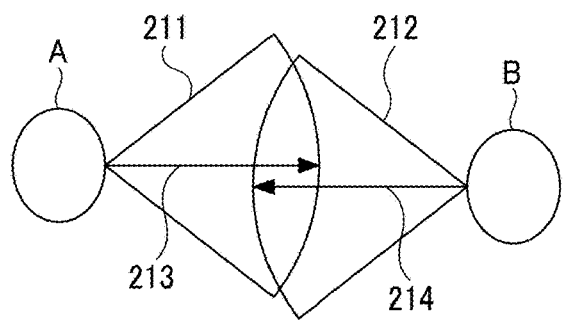
FIGS. 14A to 14C are diagrams each illustrating grouping of users.
Figure 14B:
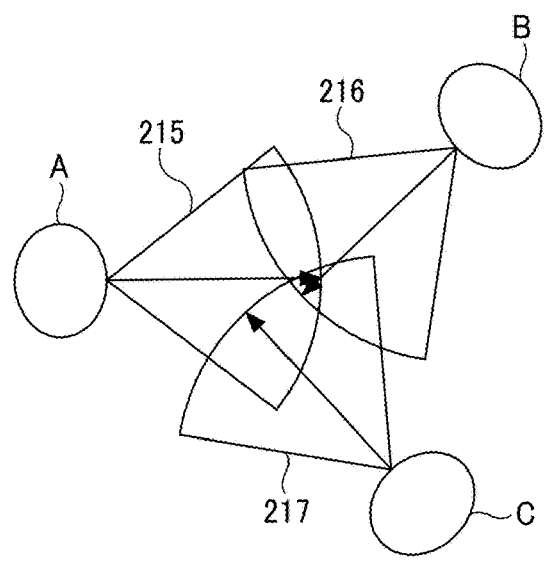
Figure 14C:
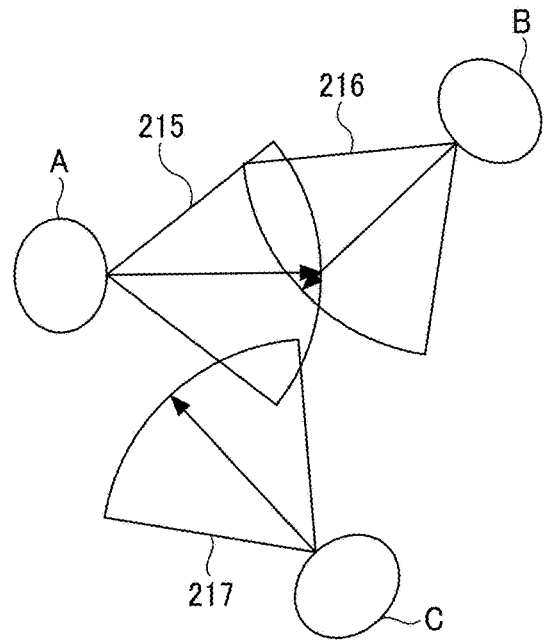

Referring to FIGS. 14A to 14C, a description is given below of grouping of users.

FIGS. 14A to 14C are diagrams each illustrating grouping of users.

A group refers to two or more users facing each other or two or more users talking face-to-face. "Facing each other" refers to a state where the distance between the users is within a threshold and the directions of the users are opposite to each other.

FIG. 14A illustrates two users A and B facing each other.

When sectors 211 and 212 set for the users A and B, respectively, overlap each other as illustrated in FIG. 14A, the users A and B face each other. The threshold of the distance for determining that the two users A and B face each other is appropriately determined (for example, about 1 meter).

Like the determination (presumption) of a group of users, the user-group presumption unit 34 can presume whether two or more users facing each other or two or more users taking face-to-face correspond to close contacts of an infected person. The close contact is, for example, a person who touches the infected person with a hand without taking necessary infection preventive measures or a person who has contacted with the infected person for 15 minutes or more at a distance (within about 1 meter) where they can touch each other when they reach out face-to-face.

The center of the sector 211 is a direction 213 whereas the center of the sector 212 is a direction 214. The angle that determines the spread of each of the sectors 211 and 212 is determined in advance. The angle that determines the spread may be such that the two users A and B are presumed to face each other. A description is given below of an example of determining whether the two users A and B face each other, with an angle of 30° forward and backward from each of the directions 213 and 214 as the angle that determines the spread. When the direction 213 is 90°, the direction completely opposite to the direction 213 is 180° opposite to the direction 213, and therefore, 90+180=270°. In other words, when the direction 214 is in a range of from 240° (=270−30) to 300° (=270+30), the user-group presumption unit 34 determines that the users A and B face each other.

FIG. 14B illustrates three users A to C facing each other.

The user-group presumption unit 34 determines whether three or more users face each other, as in the above case of two users. When sectors 215, 216, and 217 set for the users A, B, and C, respectively, overlap each other, the users A to C face each other. Specifically, the users A to C face each other because the sector 215 of the user A and the sector 216 of the user B overlap each other, the sector 215 of the user A and the sector 217 of the user C overlap each other, and the sector 216 of the user B and the sector 217 of the user C overlap each other.

Although the case of three users has been described with reference to FIG. 14B, the same applies to the case of four or more users. When the number of users having a conversation increases, the distance between the users increases. Thus, the threshold of the distance between the users may also increase according to the number of users.

The user-group presumption unit 34 may not determine that the sectors of the three users overlap each other. For example, in a case where the sector 215 of the user A and the sector 216 of the user B overlap each other and the sector 215 of the user A and the sector 217 of the user C overlap each other while the sector 216 of the user B and the sector 217 of the user C do not overlap each other as illustrated in FIG. 14C, the user-group presumption unit 34 may regard that the users B and C face each other because the users A and B face each other and the users A and C face each other.

Figure 15:
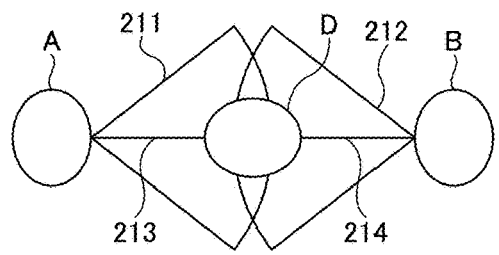
FIG. 15 is a diagram illustrating two users facing each other with another user interposed therebetween.

When another user D is between the two users A and B as illustrated in FIG. 15, the user-group presumption unit 34 does not determine that the users A and B face each other.

FIG. 15 is a diagram illustrating two users facing each other with another user interposed therebetween.

In this case, the user-group presumption unit 34 determines that the users A and D or the users A and B face each other based on the direction of the user D.

<Presumption of Nodding>

Referring to FIGS. 16A to 23, a description is given below of how to presume nodding based on one or more of the acceleration and the angular velocity.

Figure 16A:
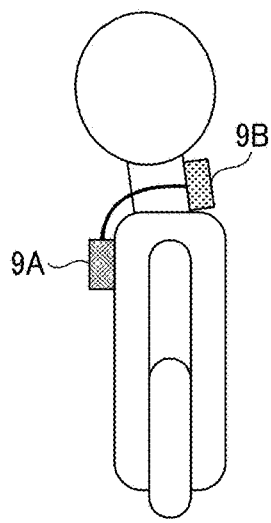
FIGS. 16A to 16C are schematic diagrams illustrating the movement of the body of a user when the user nods.
Figure 16B:
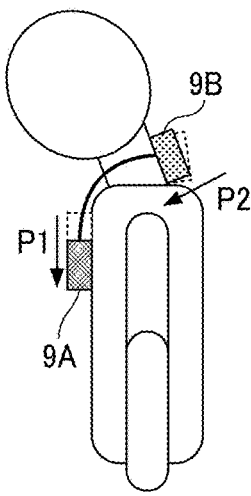
Figure 16C:
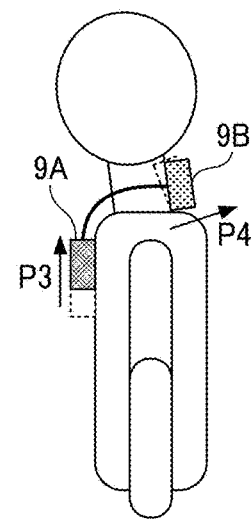

FIGS. 16A to 16C are schematic diagrams illustrating the movement of the body of a user when the user nods.

Figure 17:
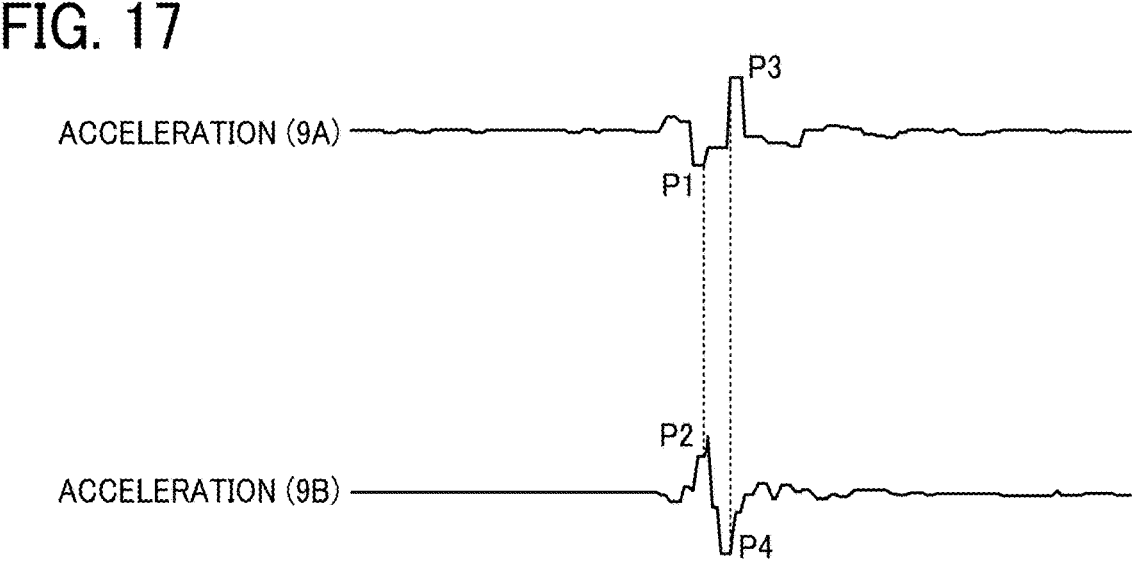
FIG. 17 is a chart of an example of changes in the acceleration detected when the body moves as illustrated in FIGS. 16A to 16C.

FIG. 17 is a chart of changes in the acceleration detected when the body moves as illustrated in FIGS. 16A to 16C.

The upper part of FIG. 17 illustrates the acceleration detected by the activity sensor 9A as an example of a first acceleration, whereas the lower part of FIG. 17 illustrates the acceleration detected by the activity sensor 9B as an example of a second acceleration.

FIG. 16A illustrates the user in an upright position before nodding.

In the present embodiment, the accelerations and angular velocities detected by the activity sensors 9A and 9B when the user is in the upright position are set as reference values. When the user is in the upright position, the activity sensor 9A is accelerated downward due to gravity (the gravity acceleration has been converted to the reference value) whereas the activity sensor 9B is accelerated forward at a reference value, which is substantially zero but has been converted to the reference value. The downward acceleration is positive in the vertical acceleration. The forward acceleration from the user is positive in the front-back direction. The rightward acceleration as viewed from the user is positive in the lateral direction.

FIG. 16B illustrates the user nodding most.

When the user moves from the state illustrated in FIG. 16A to the state illustrated in FIG. 16B, the neck moves forward, and thus the suspended activity sensor 9A moves downward due to gravity. The activity sensor 9B moves forward with the movement of the neck. Thus, the downward acceleration corresponding to the nodding is added to the activity sensor 9A whereas the activity sensor 9B is accelerated forward. The signal of the activity sensor 9A indicates a downward minimum value P1 (indicating a downward acceleration). The signal of the activity sensor 9B indicates an upward maximum value P2 (indicating a forward acceleration).

The minimum values P1 and P4 and the maximum values P2 and P3 are merely examples because the minimum values P1 and P4 and the maximum values P2 and P3 vary depending on the signals. In the following description, for the sake of simplicity, the same signals as those illustrated in FIGS. 16B and 16C are used indicating the minimum values P1 and P4 and the maximum values P2 and P3. However, the signals may be different between the sensors.

FIG. 16C illustrates the user having returned to the upright position after nodding.

When the user moves from the state illustrated in FIG. 16B to the state illustrated in FIG. 16C, the neck moves backward, and thus the suspended activity sensor 9A moves upward. The activity sensor 9B moves backward with the movement of the neck.

Thus, the activity sensor 9A is accelerated in the direction opposite to the gravity acceleration whereas the activity sensor 9B is accelerated backward. The signal of the activity sensor 9A indicates an upward maximum value P3 (indicating an upward acceleration). The signal of the activity sensor 9B indicates a downward minimum value P4 (indicating a backward acceleration).

The behavior presumption unit 67 monitors the changes in the accelerations of the activity sensors 9A and 9B as illustrated in FIGS. 16A to 16C to presume that the user has nodded.

Figure 18:
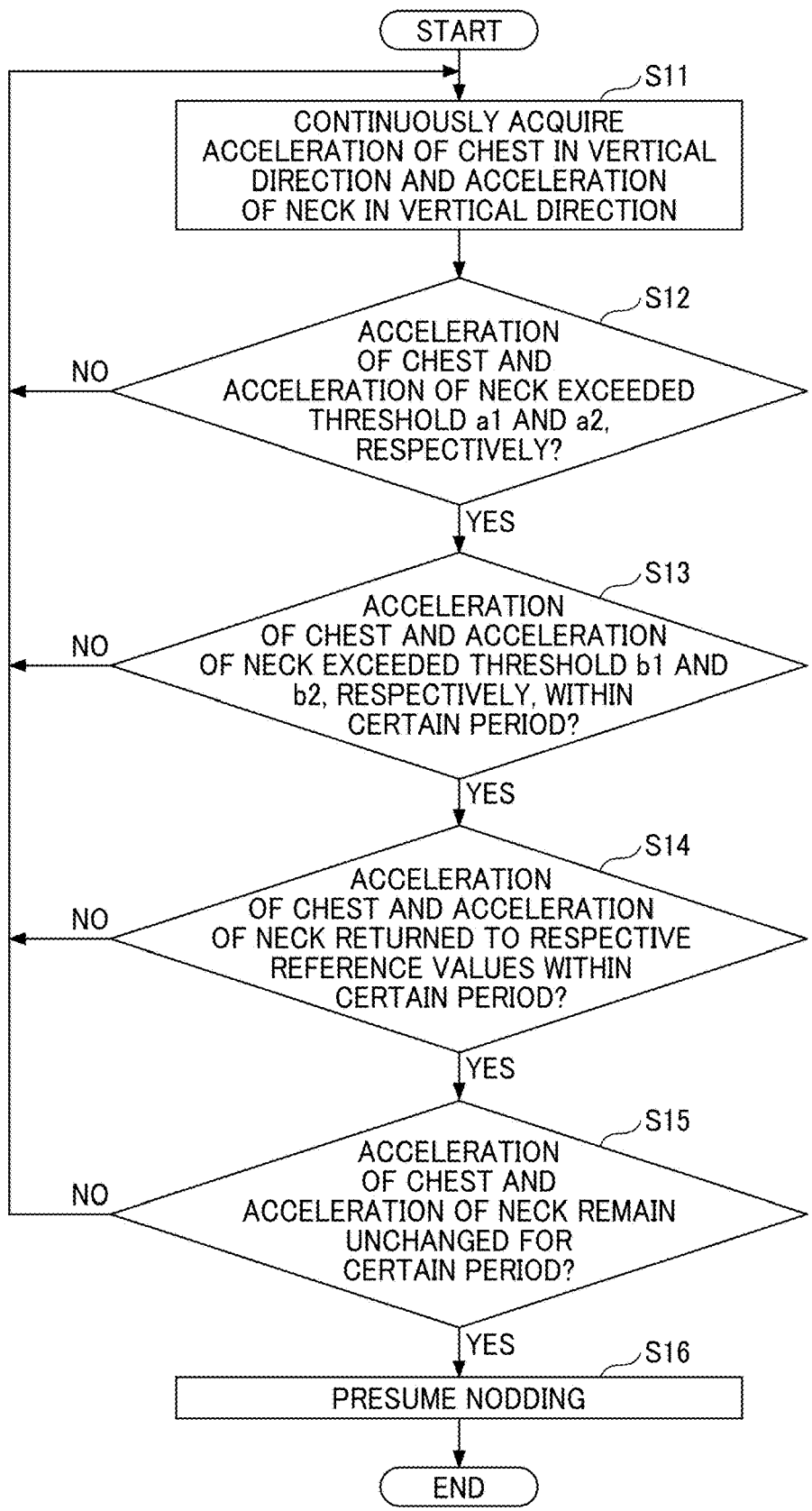
FIG. 18 is a flowchart of an example of a process in which a behavior presumption unit presumes a nodding motion.

FIG. 18 is a flowchart of a process in which the behavior presumption unit 67 presumes a nodding motion.

In step S11, the acceleration acquisition unit 62 of the activity sensor 9A and the acceleration acquisition unit 112 of the activity sensor 9B repeatedly acquire the respective accelerations in the vertical direction and the front-back direction.

In step S12, the behavior presumption unit 67 determines whether the amount of change in the acceleration of the activity sensor 9A has exceeded a threshold a1 and the amount of change in the acceleration of the activity sensor 9B has exceeded a threshold a2. This determination is made to detect whether the user has started nodding. When the amount of change in the acceleration of the activity sensor 9A has not exceeded the threshold a1 and/or the amount of change in the acceleration of the activity sensor 9B has not exceeded the threshold a2 (NO in step S12), the process returns to step S11.

When the amount of change in the acceleration of the activity sensor 9A has exceeded the threshold a1 and the amount of change in the acceleration of the activity sensor 9B has exceeded the threshold a2 (YES in step S12), in step S13, the behavior presumption unit 67 determines whether the accelerations of the activity sensors 9A and 9B has exceeded thresholds b1 and b2, respectively, within a certain period after the behavior presumption unit 67 determines that the amount of change in the acceleration of the activity sensor 9A has exceeded the threshold a1 and the amount of change in the acceleration of the activity sensor 9B has exceeded the threshold a2 (YES in step S12). Specifically, the behavior presumption unit 67 determines whether the minimum value P1 is equal to or less than the threshold b1 and whether the maximum value P2 is greater than the threshold b2. When the acceleration of the activity sensor 9A has not exceeded the threshold b1 within the certain period and/or the acceleration of the activity sensor 9B has not exceeded the threshold b2 within the certain period (NO in step S13), the process returns to step S11.

When the accelerations of the activity sensors 9A and 9B have exceeded the thresholds b1 and b2, respectively, within the certain period (YES in step S13), in step S14, the behavior presumption unit 67 determines whether the accelerations of the activity sensors 9A and 9B have returned to respective reference values within a certain period after the behavior presumption unit 67 determines that the accelerations of the activity sensors 9A and 9B have exceeded the thresholds b1 and b2, respectively, within the certain period (YES in step S13). This is to detect that the user has not kept facing down but nodded because the position of the neck returns to the original position in the nodding motion. In other words, the behavior presumption unit 67 determines whether the signals of the activity sensors 9A and 9B have returned to the reference values via the maximum value P3 and the minimum value P4, respectively. The maximum value P3 and the minimum value P4 may be compared with thresholds. When the acceleration of the activity sensor 9A has not returned to the reference value within the certain period and/or the acceleration of the activity sensor 9B has not returned to the reference value within the certain period (NO in step S14), the process returns to step S11.

When the accelerations of the activity sensors 9A and 9B have returned to the respective reference values within the certain period (YES in step S14), in step S15, the behavior presumption unit 67 determines whether the accelerations of the activity sensors 9A and 9B remain unchanged for a certain period or more. This determination is made to detect that the user has finished nodding, that is, to more reliably detect that the user has nodded. The determination in step S15 is made to reliably detect the nodding, and thus may be omitted. When the acceleration of the activity sensor 9A has changed within the certain period and/or the acceleration of the activity sensor 9B has changed within the certain period (NO in step S15), the process returns to step S11.

When the accelerations of the activity sensors 9A and 9B remain unchanged for the certain period or more (YES in step S15), in step S16, the behavior presumption unit 67 presumes that the user has nodded.

In this way, the behavior presumption unit 67 can presume that the user has nodded based on the accelerations detected by the two activity sensors 9A and 9B.

The activity sensor 9A of the user may output that the user has nodded by the own device. When the activity sensor 9A indicates that the user has nodded by, for example, blinking the LED light, the surrounding users can ascertain that the user wearing the activity sensor 9 agrees.

When a user group is formed, the information processing system 10 can notify a speaker that a listener has nodded as illustrated in FIG. 19.

FIG. 19 is a sequence diagram of a process in which the information processing system 10 notifies a speaker that a listener has nodded.

For example, a user A is a speaker and a user B is a listener in a group.

In step S201, the user-group presumption unit 34 of the information process system 10 detects the user group of the speaker and the listener.

In steps S202 and S203, the notification unit 33 notifies (gives an instruction to) the activity sensor 9A of each user in the group to turn on the LED light 708 in the same color indicating the same group, for example.

In steps S204 and S205, the activity sensor 9A of each of the user A and the user B turns on the LED light 708 in the same color.

In step S206, the user B nods. The communication unit 68 transmits the behavior (nodding) to the information processing system 10 in the communication process repeated every second, for example. The communication unit 68 transmits, for example, the identification information of the user and the information which can be detected by the activity sensors 9A and 9B such as the positional information, the direction, the behavior, the posture, and the heart rate to the information process system 10.

In step S207, the activity sensor 9A of the user B blinks first in response to the nodding of the user B.

In step S208, the saving unit 32 stores, for example, the time, the positional information, the direction, the behavior, the posture, and the heart rate in the activity information 51 in response to the transmission of the nodding of the user B from the activity sensor 9 to the information processing system 10. The notification unit 33 of the information processing system 10 notifies the speaker that a user has nodded. The notification unit 33 notifies the activity sensor 9A of the user A that a user in the group has nodded. The activity sensor 9A is an example of a sensor device. Since the information processing system 10 is also notified of the identification information of the user B, the notification unit 33 can also notify the user A of which user has nodded.

In step S209, the activity sensor 9B of the user A vibrates. Thus, the user A can ascertain that the user B has nodded. In other words, the user A can ascertain that the user B has nodded by the lighting of the activity sensor 9A of the user B and the vibration of the activity sensor 9B worn by the user A. The activity sensor 9B of the user A may output a message indicating that the user B has nodded or output sound from a speaker. This enhances the reliability and effectiveness of the employees.

Presumption of Nodding Based On Angular Velocity

Referring to FIGS. 20A to 20C, a description is given below of how to presume nodding based on the angular velocity detected by the activity sensor 9B.

FIGS. 20A to 20C are schematic diagrams illustrating the movement of the body of a user when the user nods. The differences from the presumption described above with reference to FIGS. 16A to 16C will be described with reference to FIGS. 20A to 20C.

FIG. 21 is a chart of changes in the acceleration and angular velocity detected when the body moves as illustrated in FIGS. 20A to 20C.

The upper part of FIG. 21 illustrates the acceleration detected by the activity sensor 9A as an example of the first acceleration, whereas the lower part of FIG. 21 illustrates the angular velocity detected by the activity sensor 9B. In FIG. 21, the signal of the angular velocity of the activity sensor 9B indicates the same tendency as the signal of the acceleration of the activity sensor 9B (while the absolute values are different). For this reason, FIG. 21 illustrates the signal of the angular velocity of the activity sensor 9B like the signal of the acceleration of the activity sensor 9B illustrated in FIG. 17.

FIG. 20A may be substantially the same as FIG. 16A. FIG. 20B illustrates the user nodding most.

When the user moves from the state illustrated in FIG. 20A to the state illustrated in FIG. 20B, the neck moves forward, and thus the suspended activity sensor 9A moves downward due to gravity. By contrast, the activity sensor 9B detects an angular velocity in a direction of rotation about the axis 1 because the neck rotates about the axis 1 when the user nods. Thus, the downward acceleration corresponding to the nodding is added to the activity sensor 9A whereas the activity sensor 9B detects a (positive) angular velocity of the rotation about the axis 1. The signal of the activity sensor 9A indicates the downward minimum value P1 (indicating a downward acceleration). The signal of the activity sensor 9B indicates the upward maximum value P2 (indicating a positive angular velocity of the rotation about the axis 1).

FIG. 20C illustrates the user having returned to the upright position after nodding.

When the user moves from the state illustrated in FIG. 20B to the state illustrated in FIG. 20C, the neck moves backward, and thus the suspended activity sensor 9A moves upward. As the neck rotates in the opposite direction about the axis 1, the activity sensor 9B detects the angular velocity of the rotation about the axis 1 in the opposite direction. Thus, the activity sensor 9A is accelerated in the direction opposite to the gravity acceleration whereas the activity sensor 9B detects a negative angular velocity of the rotation about the axis 1.

The signal of the activity sensor 9A indicates the upward maximum value P3 (indicating an upward acceleration). The signal of the activity sensor 9B indicates the downward minimum value P4 (indicating a negative angular velocity of the rotation about the axis 1).

The behavior presumption unit 67 monitors the changes in the accelerations and angular velocities of the activity sensors 9A and 9B as illustrated in FIGS. 20A to 20C to presume that the user has nodded.

Figure 22:
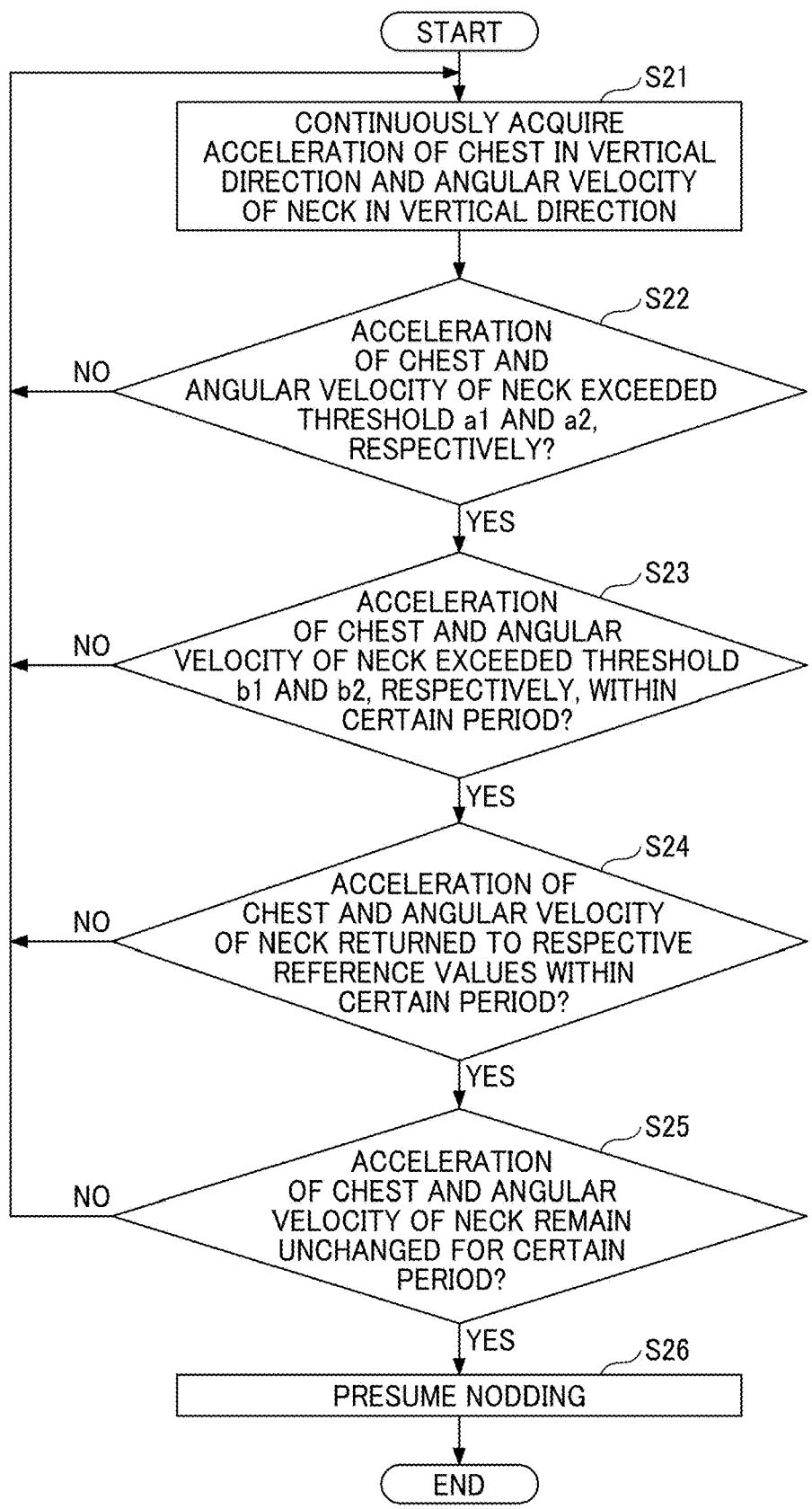
FIG. 22 is a flowchart of an example of a process in which the behavior presumption unit presumes a nodding motion.

FIG. 22 is a flowchart of a process in which the behavior presumption unit 67 presumes a nodding motion.

In step S21, the acceleration acquisition unit 62 of the activity sensor 9A repeatedly acquires the acceleration in the vertical direction whereas the angular-velocity acquisition unit 114 of the activity sensor 9B repeatedly acquires the angular velocity about the axis 1.

In step S22, the behavior presumption unit 67 determines whether the amount of change in the acceleration of the activity sensor 9A has exceeded the threshold a1 and the amount of change in the angular velocity of the activity sensor 9B has exceeded the threshold a2. This determination is made to detect whether the user has started nodding. When the amount of change in the acceleration of the activity sensors 9A has not exceeded the threshold a1 and/or the amount of change in the angular velocity of the activity sensor 9B has not exceeded the threshold a2 (NO in step S22), the process returns to step S21.

When the amount of change in the acceleration of the activity sensor 9A has exceeded the threshold a1 and the amount of change in the angular velocity of the activity sensor 9B has exceeded the threshold a2 (YES in step S22), in step S23, the behavior presumption unit 67 determines whether the acceleration of the activity sensor 9A and the angular velocity of the activity sensor 9B have exceeded the thresholds b1 and b2, respectively, within a certain period after the behavior presumption unit 67 determines that the amount of change in the acceleration of the activity sensor 9A has exceeded the threshold a1 and the amount of change in the angular velocity of the activity sensor 9B has exceeded the threshold a2 (YES in step S22). Specifically, the behavior presumption unit 67 determines whether the minimum value P1 is equal to or less than the threshold b1 and whether the maximum value P2 is greater than the threshold b2. When the acceleration of the activity sensor 9A has not exceeded the threshold b1 within the certain period and/or the angular velocity of the activity sensor 9B has not exceeded the threshold b2 within the certain period (NO in step S23), the process returns to step S21.

When the acceleration of the activity sensor 9A and the angular velocity of the activity sensor 9B have exceeded the thresholds b1 and b2, respectively, within the certain period (YES in step S23), in step S24, the behavior presumption unit 67 determines whether the acceleration of the activity sensor 9A and the angular velocity of the activity sensor 9B have returned to the respective reference values within a certain period after the behavior presumption unit 67 determines that the acceleration of the activity sensor 9A and the angular velocity of the activity sensor 9B have exceeded the thresholds b1 and b2, respectively, within the certain period (YES in step S23). This is to detect that the user has not kept facing down but nodded because the position of the neck returns to the original position in the nodding motion. In other words, the behavior presumption unit 67 determines whether the signals of the activity sensors 9A and 9B have returned to the reference values via the maximum value P3 and the minimum value P4, respectively. The maximum value P3 and the minimum value P4 may be compared with thresholds. When the acceleration of the activity sensor 9A has not returned the reference value within the certain period and/or the angular velocity of the activity sensor 9B has not returned to the reference value within the certain period (NO in step S24), the process returns to step S21.

When the acceleration of the activity sensor 9A and the angular velocity of the activity sensor 9B have returned to the respective reference values within the certain period (YES in step S24), in step S25, the behavior presumption unit 67 determines whether the acceleration of the activity sensor 9A and the angular velocity of the activity sensor 9B remain unchanged for a certain period or more. This determination is made to detect that the user has finished nodding, that is, to more reliably detect that the user has nodded. The determination in step S25 is made to reliably detect the nodding, and thus may be omitted. When the acceleration of the activity sensor 9A has changed within the certain period and/or the angular velocity of the activity sensor 9B has changed within the certain period (NO in step S25), the process returns to step S21.

When the acceleration of the activity sensor 9A and the angular velocity of the activity sensor 9B remain unchanged for the certain period or more (YES in step S25), in step S26, the behavior presumption unit 67 presumes that the user has nodded.

In this way, the behavior presumption unit 67 can presume that the user has nodded based on the acceleration and angular velocity detected by the two activity sensors 9A and 9B, respectively.

Presumption of Nodding Based On Frequency Components of Signal

The waveforms of signals illustrated in FIG. 17 are characteristic waveforms generated when a user nods. The activity sensor 9A analyzes the frequency components of such a characteristic waveform to presume the nodding. The behavior presumption unit 67 calculates a frequency spectrum by, for example, performing Fourier transform on the signal. Since a peak appears at a specific frequency when the user nods, the behavior presumption unit 67 can presume that the user has nodded when the frequency spectrum has exceeded a threshold in a certain frequency range (of from a frequency A to a frequency B).

Figure 23:
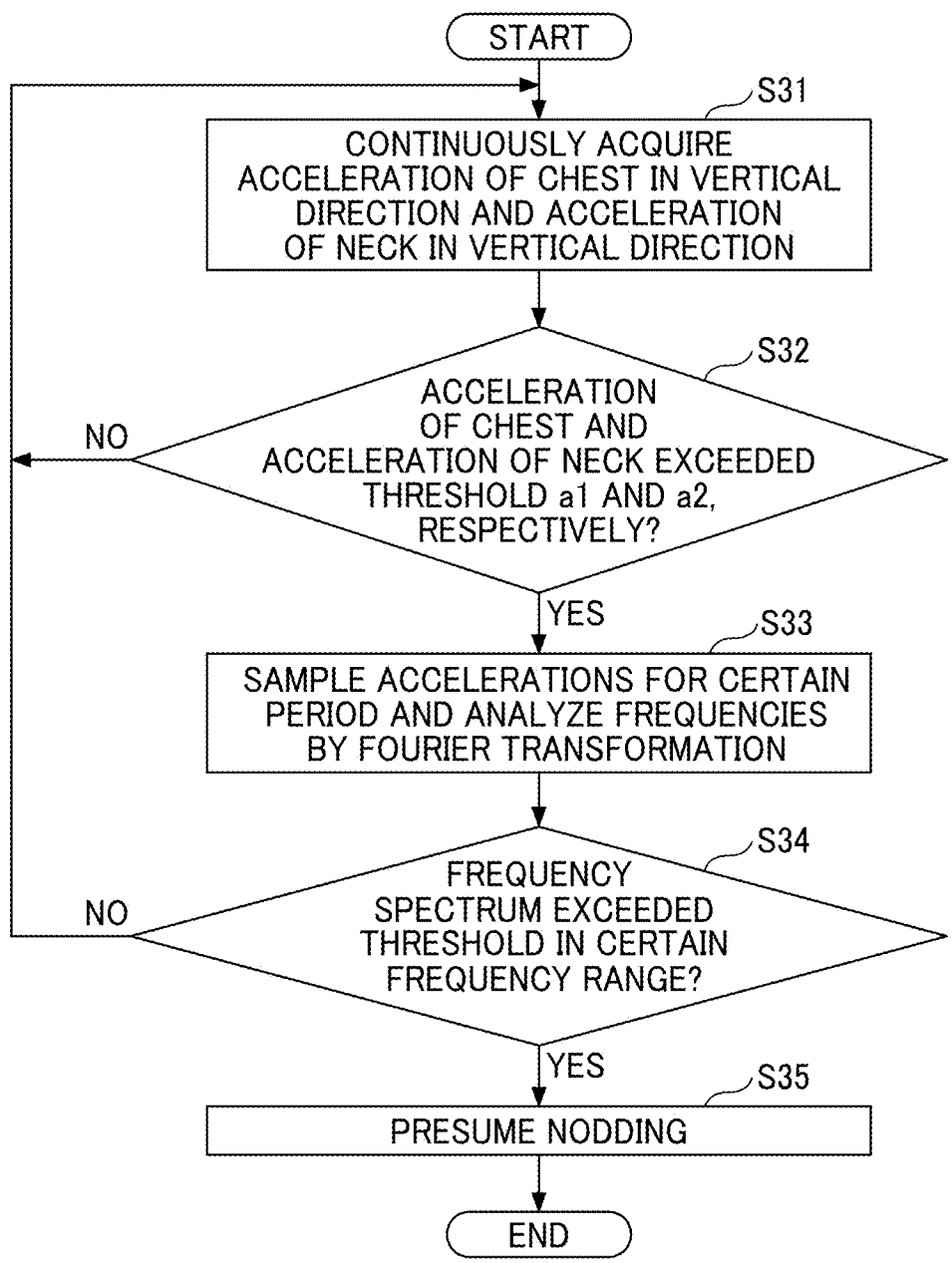
FIG. 23 is a flowchart of an example of a process in which the behavior presumption unit presumes a nodding motion based on a frequency spectrum.

FIG. 23 is a flowchart of a process in which the behavior presumption unit 67 presumes a nodding motion based on a frequency spectrum.

In step S31, the acceleration acquisition unit 62 of the activity sensor 9A and the acceleration acquisition unit 112 of the activity sensor 9B repeatedly acquire the respective accelerations in the vertical direction and the front-back direction.

In step S32, the behavior presumption unit 67 determines whether the amount of change in the acceleration of the activity sensor 9A has exceeded the threshold a1 and the amount of change in the acceleration of the activity sensor 9B has exceeded the threshold a2. This determination is made to detect whether the user has started nodding. When the amount of change in the acceleration of the activity sensors 9A has not exceeded the threshold a1 and/or the amount of change in the acceleration of the activity sensor 9B has not exceeded the threshold a2 (NO in step S32), the process returns to step S31.

When the amount of change in the acceleration of the activity sensor 9A has exceeded the threshold a1 and the amount of change in the acceleration of the activity sensor 9B has exceeded the threshold a2 (YES in step S32), in step S33, the behavior presumption unit 67 samples the accelerations of the activity sensors 9A and 9B for a certain period and generates a frequency spectrum by Fourier transform.

In step S34, the behavior presumption unit 67 determines whether each of the frequency spectrum of the signal of the acceleration detected by the activity sensor 9A and the frequency spectrum of the signal of the acceleration detected by the activity sensor 9B has exceeded a threshold in the certain frequency range (of from a frequency A to a frequency B). When the frequency spectrum of the signal of the acceleration detected by the activity sensor 9A has not exceeded the threshold and/or the frequency spectrum of the signal of the acceleration detected by the activity sensor 9B has not exceeded the threshold (NO in step S34), the process returns to step S31.

When each of the frequency spectrum of the signal of the acceleration detected by the activity sensor 9A and the frequency spectrum of the signal of the acceleration detected by the activity sensor 9B has exceeded the threshold (YES in step S34), in step S35, the behavior presumption unit 67 presumes that the user has nodded.

In this way, the behavior presumption unit 67 can presume that the user has nodded by frequency analysis of the signals of the accelerations detected by the two activity sensors 9A and 9B.

Alternatively, the behavior presumption unit 67 may presume the nodding based on the frequency spectrum of the angular velocity of the rotation about the axis 1 instead of the frequency spectrum of the acceleration. Alternatively, he behavior presumption unit 67 may presume the nodding based on the frequency spectrum of the acceleration of the activity sensor 9A and the frequency spectrum of the angular velocity of the activity sensor 9B.

Presumption of Posture

Referring to FIGS. 24A to 29, a description is given below of how to presume the posture of a user.

Figure 24A:
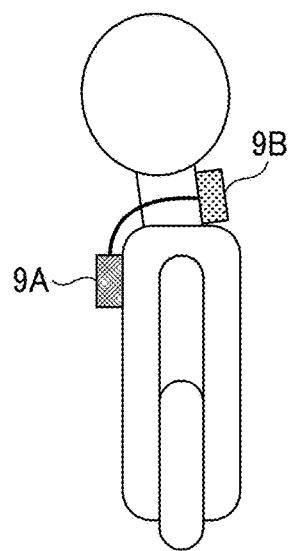
FIGS. 24A to 24C are diagrams illustrating a user in an upright posture, in a backward-leaning posture, and in a forward-leaning posture, respectively.
Figure 24B:
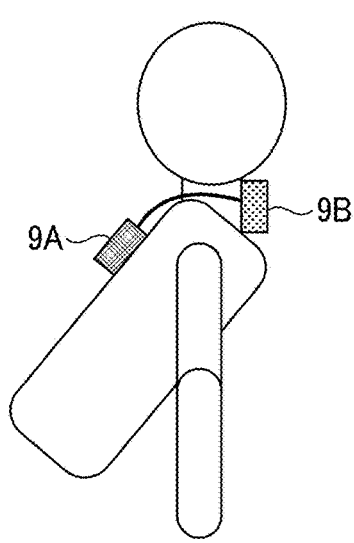
Figure 24C:
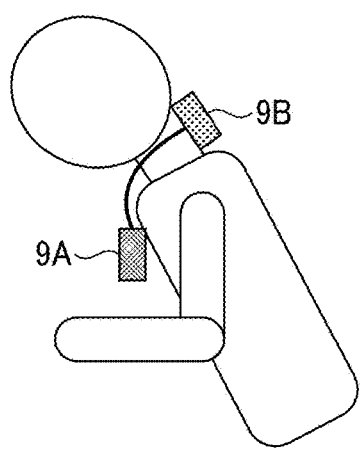

FIGS. 24A to 24C are diagrams illustrating a user in an upright posture, in a backward-leaning posture, and in a forward-leaning posture, respectively.

Referring to FIGS. 24A to 24C, a description is given below of how to presume the posture of the upper body based on the accelerations detected by the activity sensors 9A and 9B.

FIG. 24A illustrates the activity sensors 9A and 9B worn by the user in an upright position. FIG. 24B illustrates the user leaning against the backrest of a chair.

This posture often indicates that the user is relaxed or thinking deeply. When the posture is inclined, the downward acceleration detected by the activity sensor 9A is smaller than the gravity acceleration. Since the neck is at substantially the same angle as the angle of the neck in the upright position, the downward acceleration detected by the activity sensor 9B remains the same as the gravity acceleration. Thus, the behavior presumption unit 67 detects the backward-leaning posture when the difference between the downward acceleration detected by the activity sensor 9A and the downward acceleration detected by the activity sensor 9B has exceeded a threshold c.

FIG. 24C illustrates the user siting on the chair and leaning forward.

This posture often indicates that the user concentrates on (is immersed in) the desk work. Although the posture is inclined, the activity sensor 9A is suspended in the air, and thus the detected downward acceleration is approximately equal to the gravity acceleration. Since the neck is inclined forward, the downward acceleration detected by the activity sensor 9B is smaller than the gravity acceleration. Thus, the behavior presumption unit 67 detects the forward-leaning posture when the difference between the downward accelerations detected by the activity sensors 9A and the downward acceleration detected by the activity sensor 9B has exceeded a threshold d.

Figure 25:
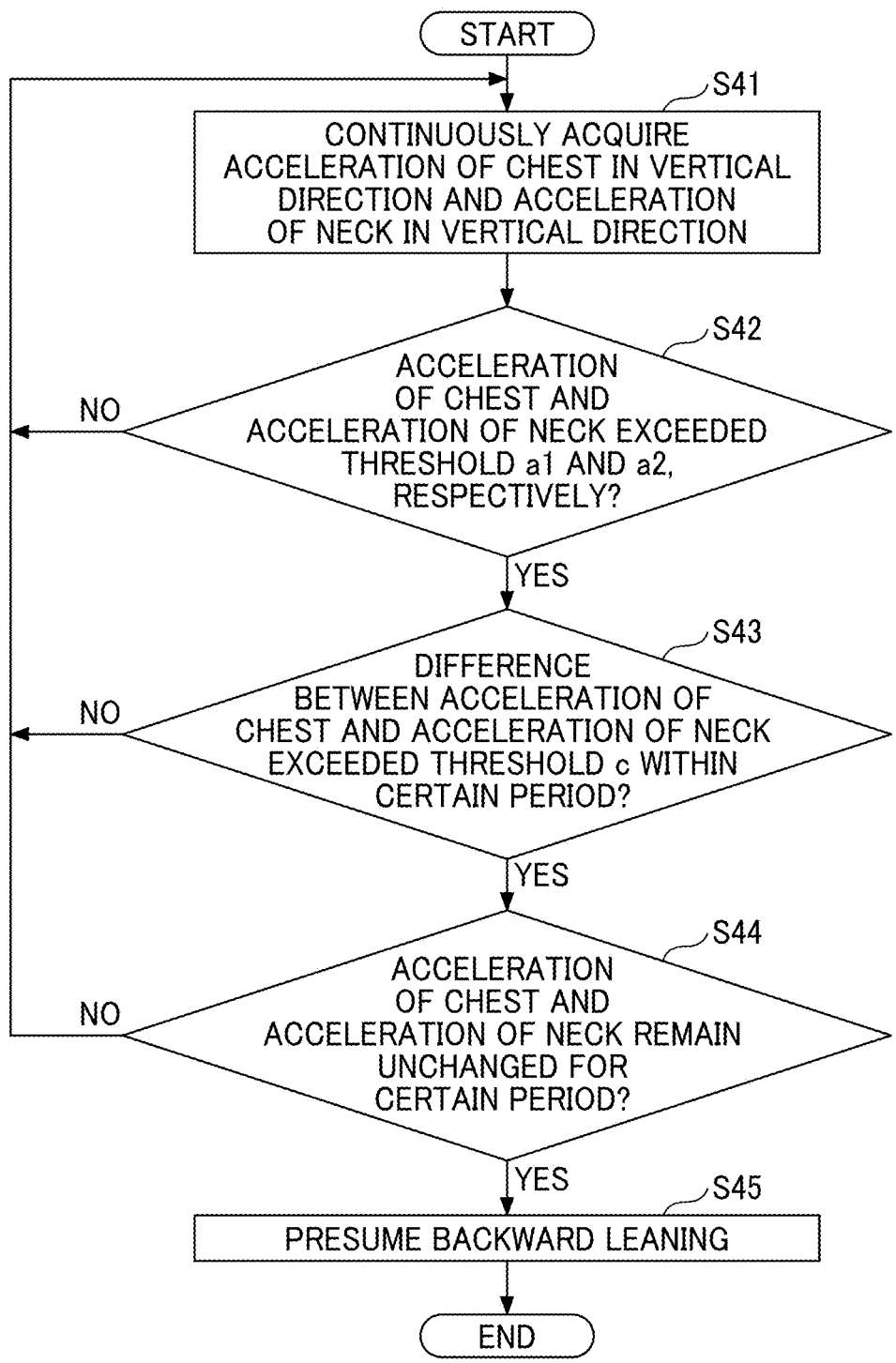
FIG. 25 is a flowchart of an example of a process in which the behavior presumption unit presumes a backward-leaning motion.

FIG. 25 is a flowchart of a process in which the behavior presumption unit 67 presumes a backward-leaning motion.

In step S41, the acceleration acquisition unit 62 of the activity sensor 9A and the acceleration acquisition unit 112 of the activity sensor 9B repeatedly acquire the respective accelerations in the vertical direction.

In step S42, the behavior presumption unit 67 determines whether the amount of change in the acceleration of the activity sensor 9A has exceeded the threshold a1. The behavior presumption unit 67 may also determine whether the acceleration of the activity sensor 9B has changed. This determination is made to detect whether the user has started leaning backward. When the amount of change in the acceleration of the activity sensor 9A has not exceeded the threshold a1 (NO in step S42), the process returns to step S41.

When the amount of change in the acceleration of the activity sensor 9A has exceeded the threshold a1 (YES in step S42), in step S43, the behavior presumption unit 67 determines whether the difference between the acceleration of the activity sensor 9A and the acceleration of the activity sensor 9B has exceeded the threshold c within a certain period after the behavior presumption unit 67 determines that the amount of change in the acceleration of the activity sensor 9A has exceeded the threshold a1 (YES in step S42). Since the acceleration of the activity sensor 9A is smaller than the acceleration of the activity sensor 9B, the behavior presumption unit 67 determines whether "the acceleration of the activity sensor 9B" minus "the acceleration of the activity sensor 9A" has exceeded the threshold c. When the difference between the acceleration of the activity sensor 9A and the acceleration of the activity sensor 9B has not exceeded the threshold c within the certain period (NO in step S43), the process returns to step S41.

When the difference between the acceleration of the activity sensor 9A and the acceleration of the activity sensor 9B has exceeded the threshold c within the certain period (YES in step S43), in step S44, the behavior presumption unit 67 determines whether the accelerations of the activity sensors 9A and 9B remain unchanged for a certain period or more. This determination is made to detect whether the user keeps leaning backward. When the acceleration of the activity sensor 9A has changed within the certain period and/or the acceleration of the activity sensor 9B has changed within the certain period (NO in step S44), the process returns to step S41.

When the accelerations of the activity sensors 9A and 9B remain unchanged for the certain period or more (YES in step S44), in step S45, the behavior presumption unit 67 presumes that the user has leaned backward. The communication unit 68 notifies the information processing system 10 in the repeated communication processes that the backward-leaning posture is detected.

In this way, the behavior presumption unit 67 can presume that the user is in the backward-leaning posture based on the accelerations detected by the two activity sensors 9A and 9B.

The activity sensor 9A of the user may output that the user is in the backward-leaning posture by the own device. When the activity sensor 9A indicates that the user is in the backward-leaning posture by, for example, vibration or sound, the user can ascertain that the user is relaxed.

Figure 26:
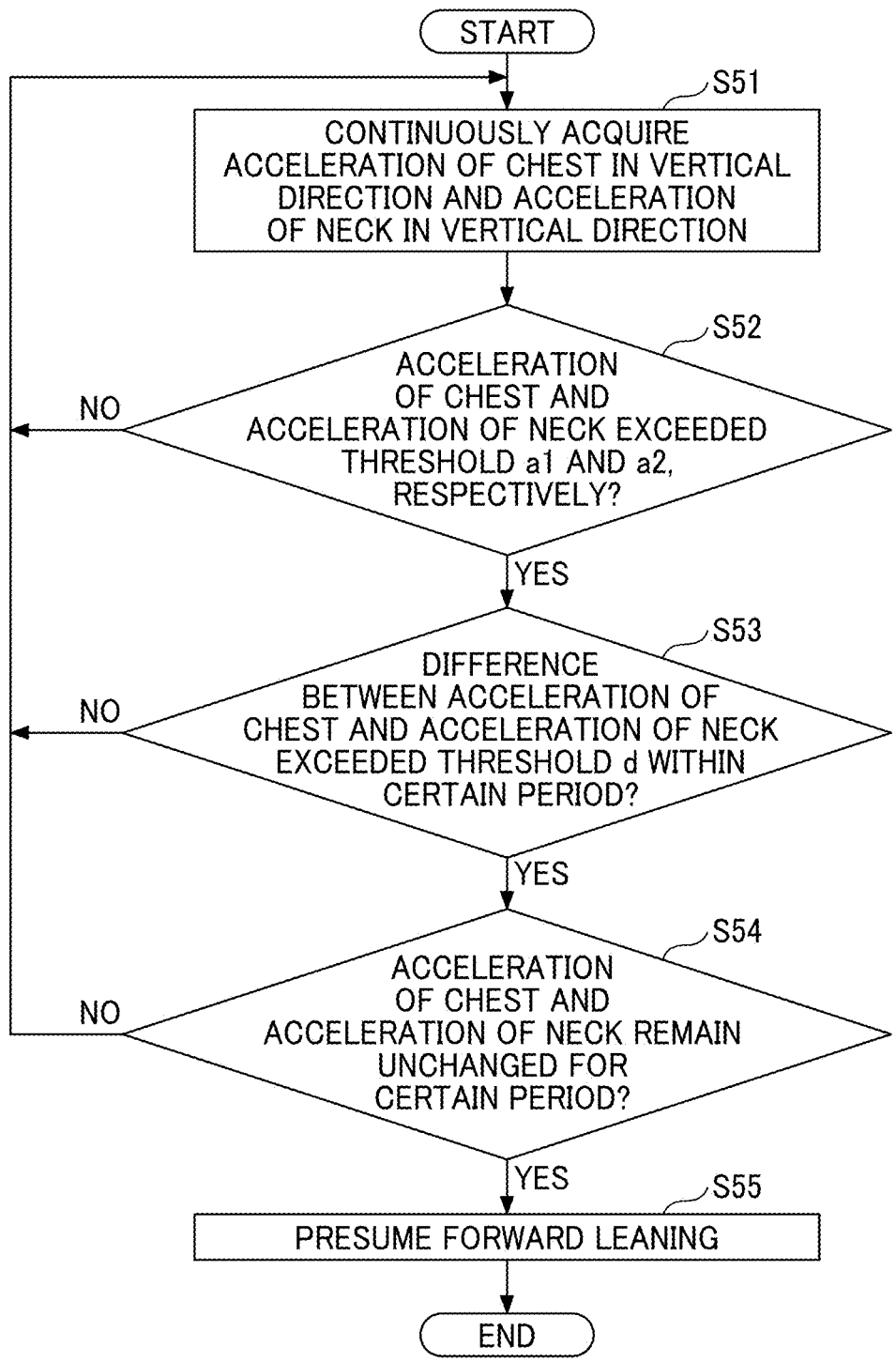
FIG. 26 is a flowchart of an example of a process in which the behavior presumption unit presumes a forward-leaning motion.

FIG. 26 is a flowchart of a process in which the behavior presumption unit 67 presumes a forward-leaning motion.

In step S51, the acceleration acquisition unit 62 of the activity sensor 9A and the acceleration acquisition unit 112 of the activity sensor 9B repeatedly acquire the respective accelerations in the vertical direction.

In step S52, the behavior presumption unit 67 determines whether the amount of change in the acceleration of the activity sensor 9B has exceeded the threshold a2. The behavior presumption unit 67 may also determine whether the acceleration of the activity sensor 9A has changed. This determination is made to detect whether the user has started leaning forward. When the amount of change in the acceleration of the activity sensor 9B has not exceeded the threshold a2 (NO in step S52), the process returns to step S51.

When the amount of change in the acceleration of the activity sensor 9B has exceeded the threshold a2 (YES in step S52), in step S53, the behavior presumption unit 67 determines whether the difference between the acceleration of the activity sensor 9A and the acceleration of the activity sensor 9B has exceeded the threshold d within a certain period after the behavior presumption unit 67 determines that the amount of change in the acceleration of the activity sensor 9B has exceeded the threshold a2 (YES in step S52). Since the acceleration of the activity sensor 9A is greater than the acceleration of the activity sensor 9B, the behavior presumption unit 67 determines whether "the acceleration of the activity sensor 9A" minus "the acceleration of the activity sensor 9B" has exceeded the threshold d. When the difference between the acceleration of the activity sensor 9A and the acceleration of the activity sensor 9B has not exceeded the threshold d within the certain period (NO in step S53), the process returns to step S51.

When the difference between the acceleration of the activity sensor 9A and the acceleration of the activity sensor 9B has exceeded the threshold d within the certain period (YES in step S53), in step S54, the behavior presumption unit 67 determines whether the accelerations of the activity sensors 9A and 9B remain unchanged for a certain period or more. This determination is made to detect whether the user keeps leaning forward. When the acceleration of the activity sensor 9A has changed within the certain period and/or the acceleration of the activity sensor 9B has changed within the certain period (NO in step S54), the process returns to step S51.

When the accelerations of the activity sensors 9A and 9B remain unchanged for the certain period or more (YES in step S54), in step S55, the behavior presumption unit 67 presumes that the user has leaned forward. The communication unit 68 notifies the information processing system 10 in the repeated communication processes that the forward-leaning posture is detected.

In this way, the behavior presumption unit 67 can presume that the user is in the forward-leaning posture based on the accelerations detected by the two activity sensors 9A and 9B.

The activity sensor 9A of the user may output that the user is in the forward-leaning posture by the own device. When the activity sensor 9A indicates that the user is in the forward-leaning posture by, for example, vibration or sound, the user can ascertain that the user is concentrating.

Figure 27A:
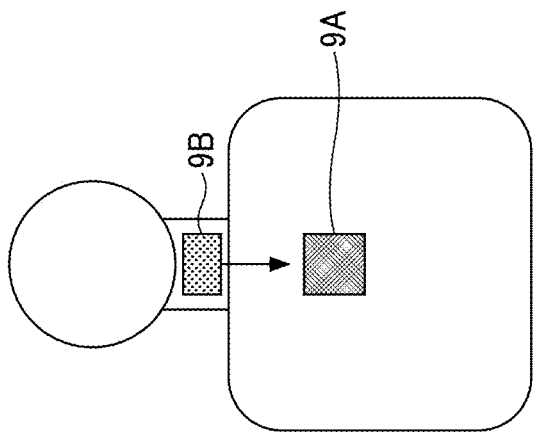
FIGS. 27A to 27C are diagrams illustrating a user in an upright position, leaning leftward, and leaning rightward, respectively.
Figure 27B:
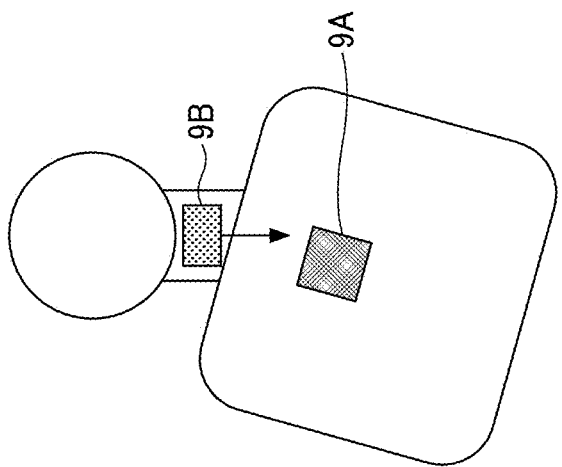
Figure 27C:
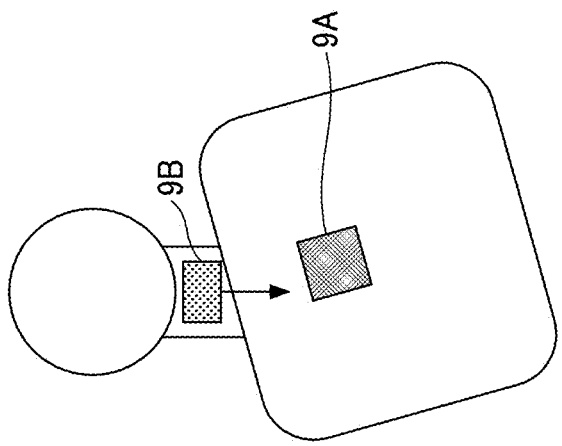

Although the detection of changes in the posture in the front-back direction has been described with reference to FIGS. 24A to 24C, the behavior presumption unit 67 can also detect changes in the posture in the lateral direction as illustrated in FIGS. 27A to 27C.

FIGS. 27A to 27C are diagrams illustrating a user in an upright position, leaning leftward, and leaning rightward, respectively.

Specifically, FIG. 27A illustrates the user in the upright position. FIG. 27B illustrates the user leaning leftward. FIG. 27C illustrates the user leaning rightward.

The posture of leaning leftward or rightward often indicates that the user is relaxed or absent-minded. Since the chest is inclined, the downward acceleration detected by the activity sensor 9A is smaller than the gravity acceleration. Since the neck is in an upright position, the downward acceleration detected by the activity sensor 9B is approximately equal to the gravity acceleration. Thus, the behavior presumption unit 67 presumes the posture of leaning leftward or rightward when the difference between the downward acceleration detected by the activity sensor 9A and the downward acceleration detected by the activity sensor 9B is greater than a threshold. Leaning leftward or rightward increases the acceleration in the lateral direction, and thus can be distinguished from the backward leaning illustrated in FIG. 24B.

Presumption of Stooping

Figure 28A:
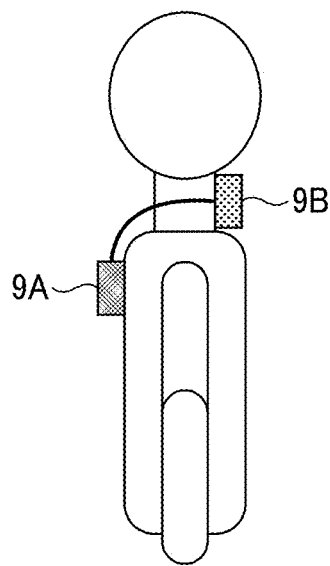
FIGS. 28A and 28B are diagrams illustrating a user in an upright posture and in a stooped posture, respectively.
Figure 28B:
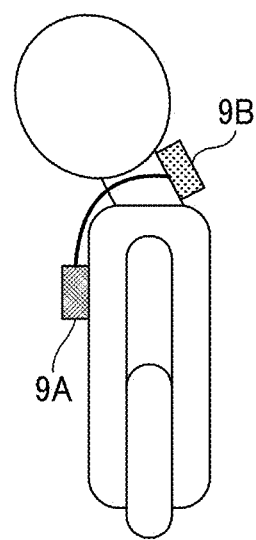

Referring to FIGS. 28A and 28B, a description is given below of presumption of stooping.

FIG. 28A illustrates a user in an upright position. FIG. 28B illustrates the user in a stooped posture.

Since the activity sensor 9A on the chest is suspended in the air when the user is in the stooped posture, the downward acceleration detected by the activity sensor 9A is approximately equal to the gravity acceleration. Since the neck moves or is inclined forward, the downward acceleration detected by the activity sensor 9B is smaller than the gravity acceleration. Thus, the behavior presumption unit 67 detects the stooped posture when the difference between the downward acceleration detected by the activity sensor 9A and the downward acceleration detected by the activity sensor 9B has exceeded a threshold c.

The difference between the stooped posture and the forward-leaning posture is that the user is sitting in the forward-leaning posture whereas the user is standing or walking in the stooped posture. Whether the user is sitting can be determined by whether the activity sensors 9A and 9B detect downward accelerations of a certain level or more.

Figure 29:
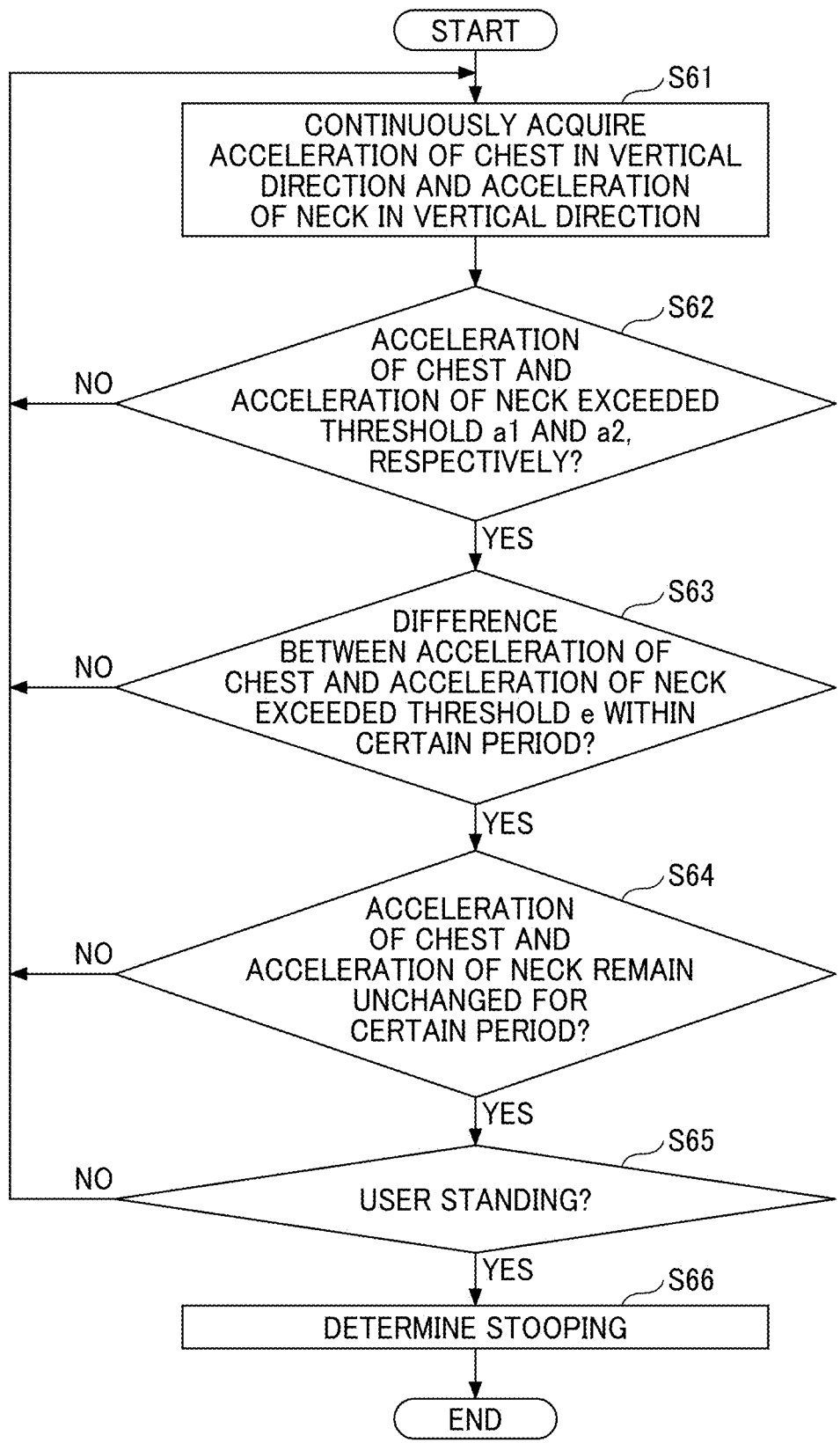
FIG. 29 is a flowchart of an example of a process in which a behavior presumption unit presumes a stooped posture.

FIG. 29 is a flowchart of a process in which the behavior presumption unit 67 presumes the stooped posture.

In step S61, the acceleration acquisition unit 62 of the activity sensor 9A and the acceleration acquisition unit 112 of the activity sensor 9B repeatedly acquire the respective accelerations in the vertical direction.

In step S62, the behavior presumption unit 67 determines whether the amount of change in the acceleration of the activity sensor 9B has exceeded the threshold a2. The behavior presumption unit 67 may also determine whether the acceleration of the activity sensor 9A has changed. This determination is made to detect whether the user has started to take the stooped posture. Since the stooped posture changes gradually, the determination in step S62 may be omitted. When the amount of change in the acceleration of the activity sensor 9B has exceeded the threshold a2 (NO in step S62), the process returns to step S61.

When the amount of change in the acceleration of the activity sensor 9B has exceeded the threshold a2 (YES in step S62), in step S63, the behavior presumption unit 67 determines whether the difference between the acceleration of the activity sensor 9A and the acceleration of the activity sensor 9B has exceeded the threshold e within a certain period after the behavior presumption unit 67 determines that the amount of change in the acceleration of the activity sensor 9B has exceeded the threshold a2 (YES in step S62). Since the acceleration of the activity sensor 9A is greater than the acceleration of the activity sensor 9B, the behavior presumption unit 67 determines whether "the acceleration of the activity sensor 9A" minus "the acceleration of the activity sensor 9B" has exceeded the threshold e. When the difference between the acceleration of the activity sensor 9A and the acceleration of the activity sensor 9B has not exceeded the threshold e within the certain period (NO in step S63), the process returns to step S61.

When the difference between the acceleration of the activity sensor 9A and the acceleration of the activity sensor 9B has exceeded the threshold e within the certain period (YES in step S63), in step S64, the behavior presumption unit 67 determines whether the accelerations of the activity sensors 9A and 9B remain unchanged for a certain period or more. This determination is made to detect whether the user keeps the stooped posture. When the acceleration of the activity sensor 9A has changed within the certain period and/or the acceleration of the activity sensor 9B has changed within the certain period (NO in step S64), the process returns to step S61.

When the accelerations of the activity sensors 9A and 9B remain unchanged for the certain period or more (YES in step S64), in step S65, the behavior presumption unit 67 determines whether the user is standing. This determination is made based on whether the downward accelerations of the activity sensors 9A and 9B indicate the lowering of the thresholds at which it can be regarded that the user sits down by the start of the process of FIG. 29. When the user is not standing (NO in step S65), the process returns to step S61.

When the user is standing (YES in step S65), in step S66, the behavior presumption unit 67 presumes that the user is in the stooped posture. The communication unit 68 notifies the information processing system 10 in the repeated communication processes that the stooped posture is detected.

In this way, the behavior presumption unit 67 can presume that the user is in the stooped posture based on the accelerations detected by the two activity sensors 9A and 9B.

The activity sensor 9A of the user may output that the user is in the stooped posture by the own device. When the activity sensor 9A outputs that the user is in the stooping posture by, for example, vibration or sound, the user can ascertain that the user is in the stooped posture and should correct the posture.

Presumption of Head-Shaking

Figure 30A:
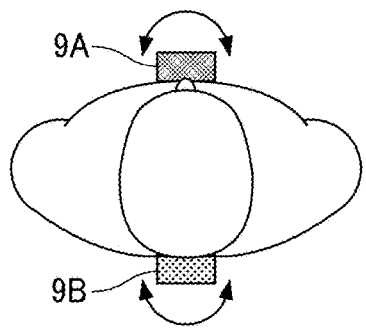
FIGS. 30A to 30C are schematic diagrams illustrating the movement of the body of a user when the user shakes his or her head.
Figure 30B:
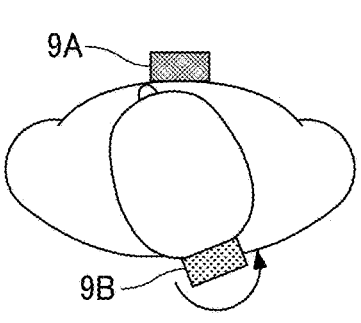
Figure 30C:
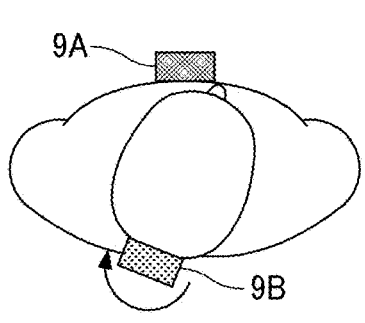
Figure 31:
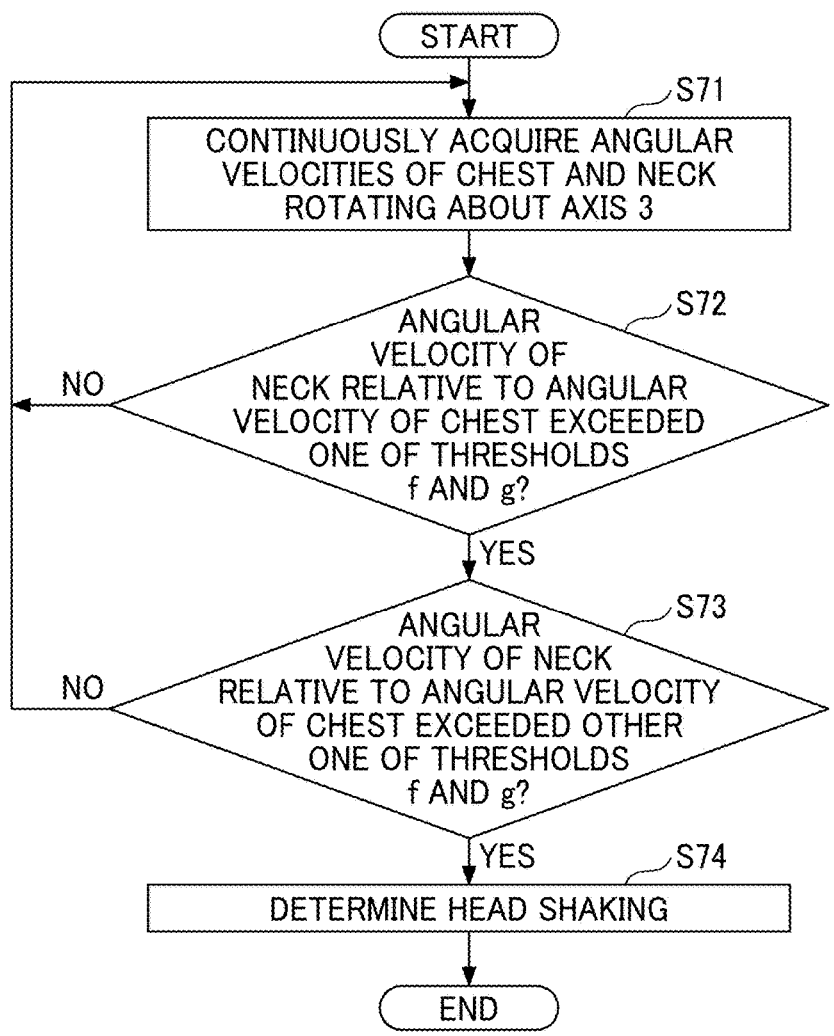
FIG. 31 is a flowchart of an example of a process in which the behavior presumption unit presumes a head-shaking motion.

Referring to FIGS. 30A to 31, a description is given below of presumption of a head-shaking motion.

FIGS. 30A to 30C are schematic diagrams illustrating the movement of the body of a user when the user shakes his or her head.

FIG. 30A illustrates the user in an upright position before shaking his or her head. FIG. 30B illustrates the user shaking his or her head to the left.

When the user moves from the state illustrated in FIG. 30A to the state illustrated in FIG. 30B, the chest remains facing forward, and thus no angular velocity is generated on the activity sensor 9A. By contrast, the activity sensor 9B detects the angular velocity of the rotation to the left about the axis 3.

FIG. 30C illustrates the user shaking his or her head to the right.

When the user moves from the state illustrated in FIG. 30B to the state illustrated in FIG. 30C, the chest remains facing forward, and thus no angular velocity is generated on the activity sensor 9A. By contrast, the activity sensor 9B detects the angular velocity of the rotation to the right about the axis 3.

Thus, the behavior presumption unit 67 can detect the head-shaking motion based on the difference between the angular velocity of the activity sensor 9A and the angular velocity of the activity sensor 9B.

FIG. 31 is a flowchart of a process in which the behavior presumption unit 67 presumes the head-shaking motion.

In step S71, the angular-velocity acquisition unit 63 of the activity sensor 9A and the angular-velocity acquisition unit 114 of the activity sensor 9B repeatedly acquire the respective angular velocities of the rotation about the axis 3. The angular velocity acquired by the angular-velocity acquisition unit 63 of the activity sensor 9A is an example of a first angular velocity. The angular velocity acquired by the angular-velocity acquisition unit 114 of the activity sensor 9B is an example of a second angular velocity.

In step S72, the behavior presumption unit 67 determines whether the difference between the angular velocity of the activity sensor 9A and the angular velocity of the activity sensor 9B has exceeded one of thresholds f and g. Since the angular velocity of the activity sensor 9B can take positive and negative values, the thresholds f and g are thresholds for detecting a change in the angular velocity in the positive direction and a change in the angular velocity in the negative direction, respectively. When the difference between the angular velocity of the activity sensor 9A and the angular velocity of the activity sensor 9B has not exceeded one of thresholds f and g (NO in step S72), the process returns to step S71.

When the difference between the angular velocity of the activity sensor 9A and the angular velocity of the activity sensor 9B has exceeded one of the thresholds f and g (YES in step S72), in step S73, the behavior presumption unit 67 determines whether the difference between the angular velocity of the activity sensor 9A and the angular velocity of the activity sensor 9B has exceeded the other one of the thresholds f and g. In other words, when the user shakes his or her head to the left in step S72, the behavior presumption unit 67 determines whether the user shakes his or her head to the right in step S73. When the user shakes his or her head to the right in step S72, the behavior presumption unit 67 determines whether the user shakes his or her head to the left in step S73. When the difference between the angular velocity of the activity sensor 9A and the angular velocity of the activity sensor 9B has not exceeded the other one of the thresholds f and g (NO in step S73), the process returns to step S71.

When the difference between the angular velocity of the activity sensor 9A and the angular velocity of the activity sensor 9B has exceeded the other one of the thresholds f and g (YES in step S73), in step S74, the behavior presumption unit 67 presumes that the user has shaken his or her head. The communication unit 68 notifies the information processing system 10 in the repeated communication processes that the head-shaking behavior is detected.

In this way, the behavior presumption unit 67 can presume that the user has shaken his or her head based on the accelerations detected by the two activity sensors 9A and 9B.

Like the notification of the nodding, the LED light 708 of the activity sensor 9 of the user may be turned on to indicate that the user has shaken his or her head, and the information processing system 10 may notify the activity sensors 9 of the other users in the same group as the user that the user has shaken his or her head. The nodding and the head shaking are distinguished from each other by the difference in, for example, the color of light of the LED light 708, the way of blinking of the LED light 708, the rhythm of vibration, or messages. Since the user A (speaker) can ascertain that the user B (listener) has indicated a negative reaction, the user A (speaker) can take measures such as an individual consultation with the user B.

Presumption of Head Cocking

Figure 32A:
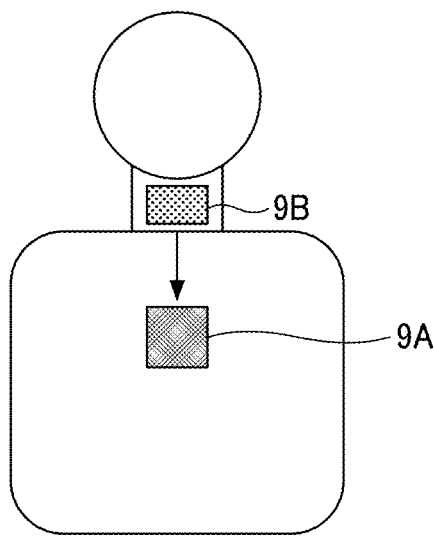
FIGS. 32A and 32B are schematic diagrams illustrating the movement of the body of a user when the user cocks his or her head.
Figure 32B:
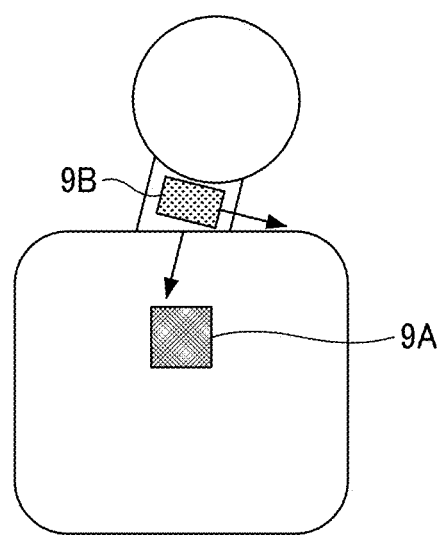
Figure 33:
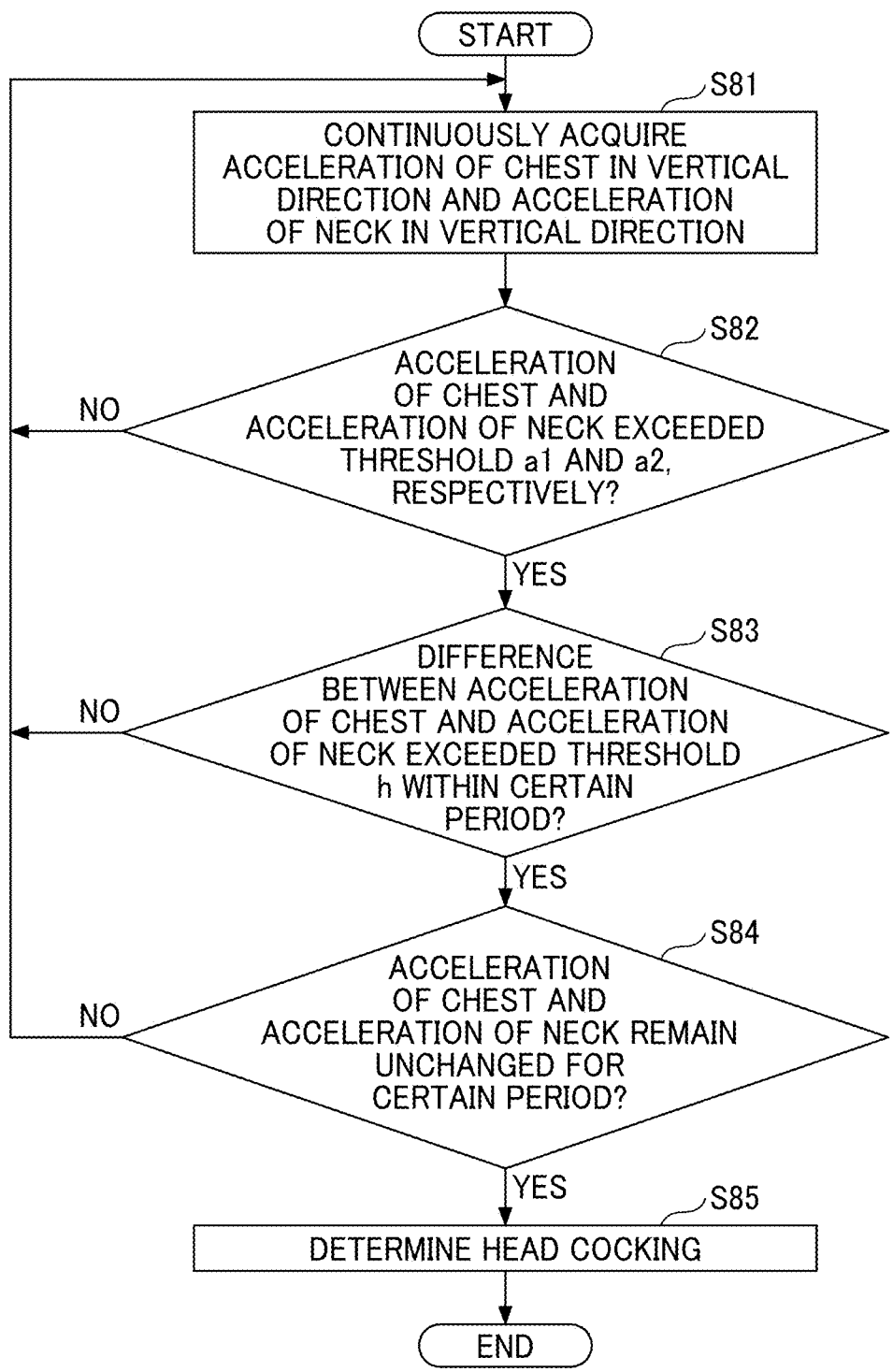
FIG. 33 is a flowchart of an example of a process in which the behavior presumption unit presumes a head-cocking motion.

Referring to FIGS. 32A to 33, a description is given below of presumption of a head-cocking motion.

FIGS. 32A and 32B are schematic diagrams illustrating the movement of the body of a user when the user cocks his or her head.

FIG. 32A illustrates the user in an upright position before cocking his or her head. FIG. 32B illustrates the user cocking his or her head.

When the user moves from the state illustrated in FIG. 32A to the state illustrated in FIG. 32B, the chest is not inclined, and thus the downward acceleration of the activity sensor 9A is approximately equal to the gravity acceleration. By contrast, the activity sensor 9B is inclined to the left together with the neck, and thus detects an acceleration smaller than the gravity acceleration.

FIG. 33 is a flowchart of a process in which the behavior presumption unit 67 presumes the head-cocking motion.

In step S81, the acceleration acquisition unit 62 of the activity sensor 9A and the acceleration acquisition unit 112 of the activity sensor 9B repeatedly acquire the respective accelerations in the vertical direction.

In step S82, the behavior presumption unit 67 determines whether the amount of change in the acceleration of the activity sensor 9B has exceeded the threshold a2. The behavior presumption unit 67 may also determine whether the acceleration of the activity sensor 9A has changed. This determination is made to detect whether the user has started to take a head-cocking posture. When the amount of change in the acceleration of the activity sensor 9B has not exceeded the threshold a2 (NO in step S82), the process returns to step S81.

When the amount of change in the acceleration of the activity sensor 9B has exceeded the threshold a2 (YES in step S82), in step S83, the behavior presumption unit 67 determines whether the difference between the acceleration of the activity sensor 9A and the acceleration of the activity sensor 9B has exceeded a threshold h within a certain period after the behavior presumption unit 67 determines that the amount of change in the acceleration of the activity sensor 9B has exceeded the threshold a2 (YES in step S82). Since the acceleration of the activity sensor 9A is greater than the acceleration of the activity sensor 9B, the behavior presumption unit 67 determines whether "the acceleration of the activity sensor 9A" minus "the acceleration of the activity sensor 9B" has exceeded the threshold h. When the difference between the acceleration of the activity sensor 9A and the acceleration of the activity sensor 9B has not exceeded the threshold h within the certain period (NO in step S83), the process returns to step S81.

When the difference between the acceleration of the activity sensor 9A and the acceleration of the activity sensor 9B has exceeded the threshold h within the certain period (YES in step S83), in step S84, the behavior presumption unit 67 determines whether the accelerations of the activity sensors 9A and 9B remain unchanged for a certain period or more. This determination is made to detect whether the user keeps the head-cocking posture. When the acceleration of the activity sensor 9A has changed within the certain period and/or the acceleration of the activity sensor 9B has changed within the certain period (NO in step S84), the process returns to step S81.

When the accelerations of the activity sensors 9A and 9B remain unchanged for a certain period or more (YES in step S84), in step S85, the behavior presumption unit 67 presumes that the user is in the head-cocking posture. The communication unit 68 notifies the information processing system 10 in the repeated communication processes that the head-cocking behavior is detected.

In this way, the behavior presumption unit 67 can presume that the user is in the head-cocking posture based on the accelerations detected by the two activity sensors 9A and 9B. In other words, the behavior presumption unit 67 can presume that the user has cocked his or her head, which is a representative behavior of people who feel "it doesn't ring true."

Like the notification of the nodding, the activity sensor 9 of the user may be turned on to indicate that the user has cocked his or her head, and the information processing system 10 may notify the activity sensors 9 of the other users in the same group as the user that the user has cocked his or her head. The nodding and the head cocking are distinguished from each other by the difference in, for example, the color of light of the LED light 708, the way of blinking of the LED light 708, the rhythm of vibration, or messages. Since the user A (speaker) can ascertain that the user B (listener) has shown a reaction posing a question, the user A (speaker) can take measures such as an individual consultation with the user B.

In step S83, the behavior presumption unit 67 may determine that the angular velocity of the rotation about the axis 2 detected by the activity sensor 9B has changed beyond the threshold while the angular velocity of the activity sensor 9A remains unchanged.

Presumption of Facial Directions of Speaker and Listener

The information processing system 10 can presume the goodness of communication by presuming whether the listener is facing the speaker.

Figure 34:
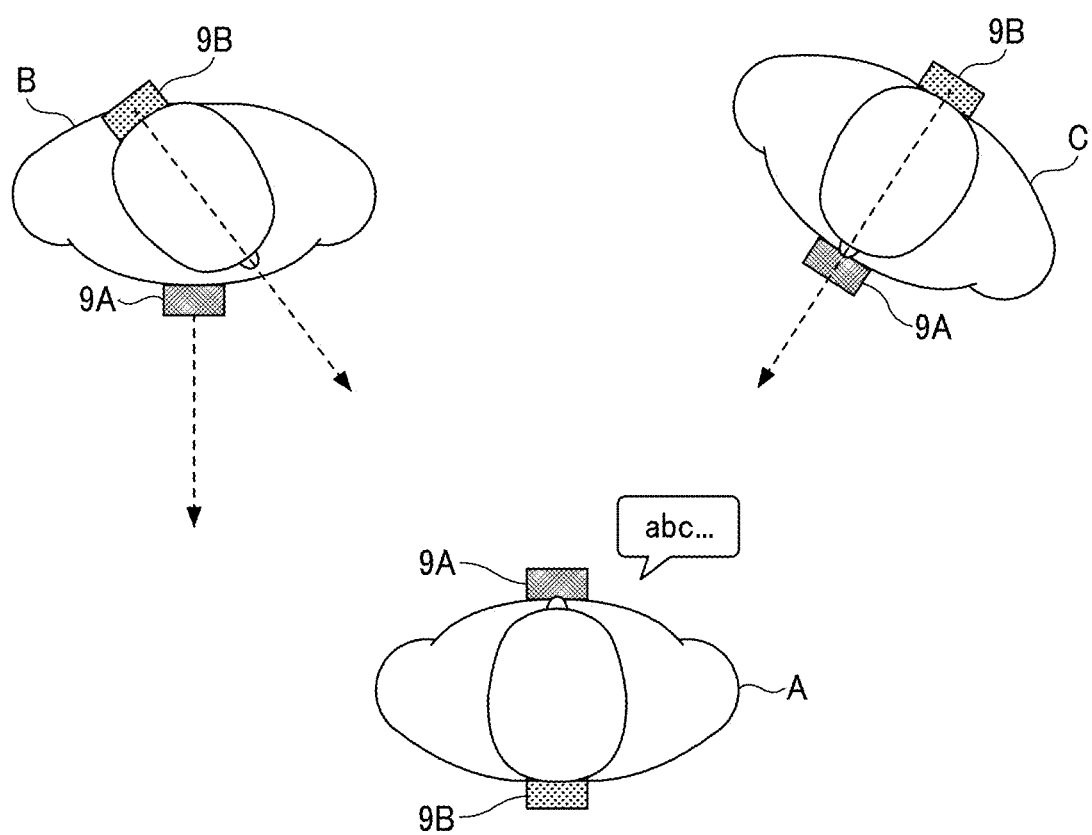
FIG. 34 is a diagram illustrating the facial directions of users.

Referring to FIG. 34, a description is given below of how to presume a facial direction. FIG. 34 is a diagram illustrating the facial directions of users.

A user A is a speaker. Users B and C are listeners. The users A to C are determined as a group of users. The user C directs his or her body and neck toward the user A, whereas the user B directs only his or her neck toward the user A. In this case, the listening-level presumption unit 42 can determine that the user C is at a higher listening level than the user B.

It can be determined by the direction whether each user directs only his or her neck or directs his or her body and neck. In other words, when the direction detected by the activity sensor 9A is the same as the direction detected by the activity sensor 9B, it can be determined that the listening level is high.

Figure 35:
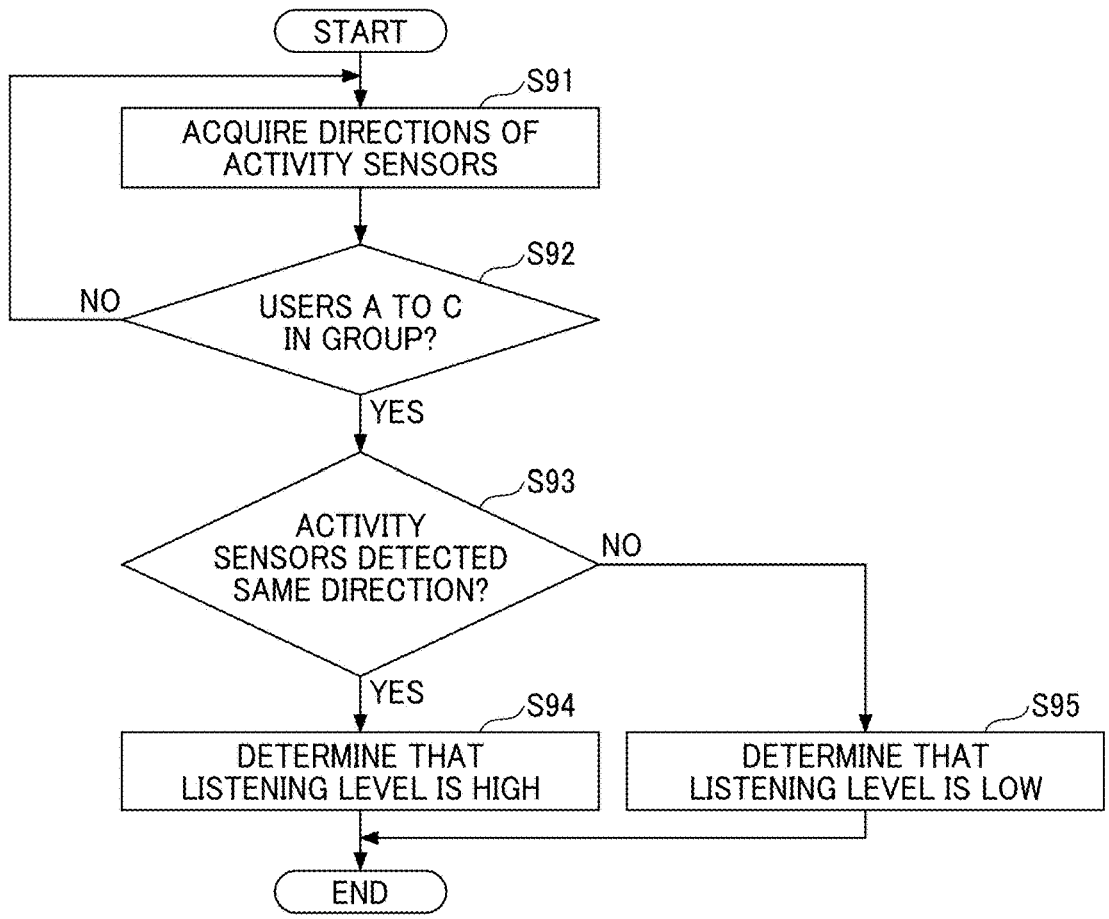
FIG. 35 is a flowchart of an example of a process in which a listening-level presumption unit presumes the listening level based on a facial direction.

FIG. 35 is a flowchart of a process in which the listening-level presumption unit 42 presumes the listening level based on the facial direction.

In step S91, the direction acquisition unit 64 of the activity sensor 9A and the direction acquisition unit 113 of the activity sensor 9B repeatedly acquire the respective directions. The direction acquired by the direction acquisition unit 64 of the activity sensor 9A is an example of first direction information. The direction acquired by the direction acquisition unit 113 of the activity sensor 9B is an example of second direction information.

The direction may be presumed from a signal of the geomagnetic sensor or may be presumed from a signal of the angular velocity of each of the acceleration/angular-velocity sensors 705 and 712. For example, each of the direction acquisition units 64 and 113 determines that the direction immediately after the user enters the conference room is the direction in which the user faces with his or her back to the door, and thereafter, the direction can be presumed by integrating the angular velocities.

In step S92, the listening-level presumption unit 42 determines whether the users A to C are determined as a group of users. The information processing system 10 notifies the listening-level presumption unit 42 that the users A to C are determined as a group of users at present. When the users A to C are not determined as a group of users (NO in step S92), the process returns to step S91.

When the users A to C are determined as a group of users (YES in step S92), in step S93, the listening-level presumption unit 42 determines whether the activity sensors 9A and 9B have detected the same direction for each user. The directions detected by the activity sensors 9A and 9B are not necessarily completely the same. For example, a difference of about 5° may be regarded as the same.

When the activity sensors 9A and 9B have detected the same direction (YES in step S93), in step S94, the listening-level presumption unit 42 determines that the listening level of the user is high. In determining the listening level, the listening-level presumption unit 42 may also determine whether another user is a speaker and whether the user (listener) faces the speaker. Any of these can be notified by the information processing system 10.

When the activity sensors 9A and 9B have not detected the same direction (NO in step S93), in step S95, the listening-level presumption unit 42 determines that the listening level of the user is low. The communication unit 68 notifies the information processing system 10 in the repeated communication processes that the listening level is higher or low.

In this way, the listening-level presumption unit 42 can presume the listening level of the user based on the directions detected by the two activity sensors 9A and 9B. Accordingly, the goodness of communication can be presumed.

For example, in a case where the user A is a speaker and the user B is a listener, the user A can ascertain that the user B listens to the user A carefully when the activity sensor 9A of the user B turns on the LED light in a color or a blinking pattern corresponding to the listening level of the user B to indicate the listening level of the user B. Like the notification of the nodding, the information processing system 10 notifies the activity sensor 9A of the user A of the listening level of the user B, and the activity sensor 9B of the user A vibrates with an intensity corresponding to the listening level to notify the user A of the listening level of the user B.

Reinforcement of Behavior with Utterance Data

Figure 36:
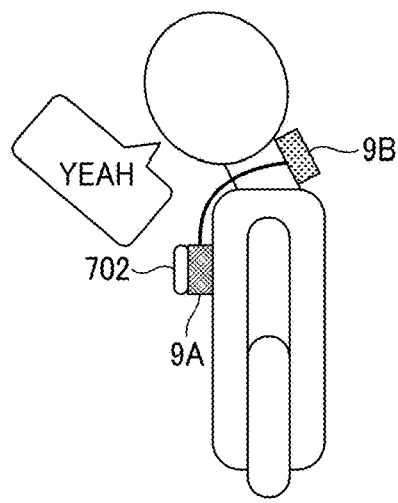
FIG. 36 is a diagram illustrating a user nodding and uttering "yeah;"
Figure 37:
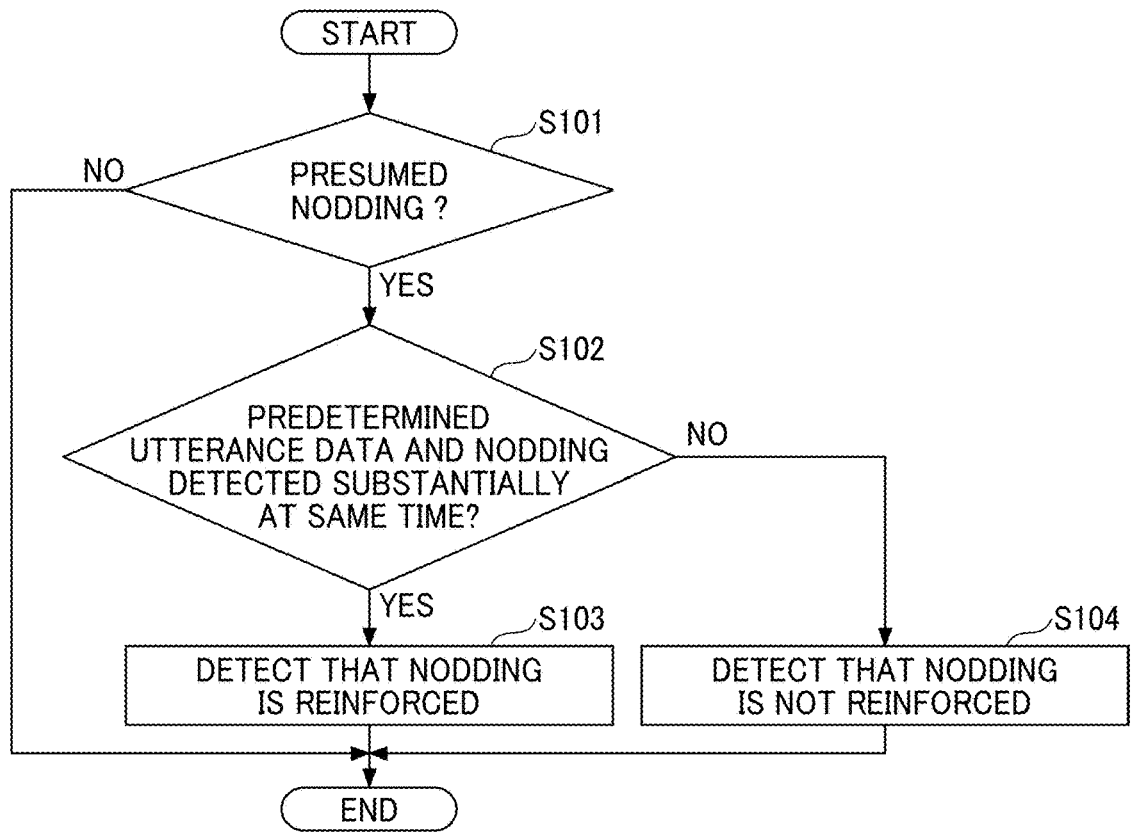
FIG. 37 is a flowchart of an example of the reinforcement of a behavior with utterance data.

Referring to FIGS. 36 and 37, a description is given below of reinforcement of a behavior with utterance data.

FIG. 36 illustrates a user nodding and uttering "yeah." Since the microphone 702 is incorporated in the activity sensor 9A and is near the mouth of the user, the activity sensor 9A can acquire the voice data with high sensitivity. For example, when the user makes a murmur at the same time as nodding, the microphone 702 located near the mouth allows the activity sensor 9A to acquire a small voice at the same time as acquisition of the behavior. The degree of reinforcement of the behavior can also be presumed based on the volume of the voice.

FIG. 37 is a flowchart of the reinforcement of a behavior with utterance data.

In step S101, the behavior presumption unit 67 determines whether the behavior presumption unit 67 has presumed the nodding motion. The method for presuming the nodding motion may be any of the above methods. When the behavior presumption unit 67 has not presumed the nodding motion (NO in step S101), the process ends.

When the behavior presumption unit 67 has presumed the nodding motion (YES in step S101), in step S102, the behavior presumption unit 67 determines whether predetermined utterance data and the nodding are detected substantially at the same time. The predetermined utterance data is associated with the presumed behavior in the behavior utterance information 52. This determination may be made by the information processing system 10. The behavior presumption unit 67 may presume the degree of reinforcement based on the volume of the utterance.

When the predetermined utterance data and the nodding are detected substantially at the same time (YES in step S102), in step S103, the behavior presumption unit 67 detects that the nodding is reinforced. When the predetermined utterance data and the nodding are not detected substantially at the same time (NO in step S102), in step S104, the behavior presumption unit 67 detects that the nodding is not reinforced. The communication unit 68 notifies the information processing system 10 in the repeated communication processes whether the nodding is reinforced.

In this way, the behavior presumption unit 67 can reinforce the presumed behavior of the user with the utterance data. For example, in a case where the user A is a speaker and the user B is a listener, the user A can ascertain that the user B agrees when the activity sensor 9A of the user B turns on the LED light in a color or a blinking pattern corresponding to the degree of reinforcement to indicate that the user B has strongly nodded. Like the notification of the nodding, the information processing system 10 notifies the activity sensor 9A of the user A that the user B has strongly nodded. When the vibration motor 714 of the activity sensor 9A of the user A vibrates in a vibration pattern corresponding to the degree of reinforcement or outputs sound, the user A can ascertain the degree of reinforcement of the user B.

Psychological Safety At Time Of Behaving Based On Vital Data

Figure 38:
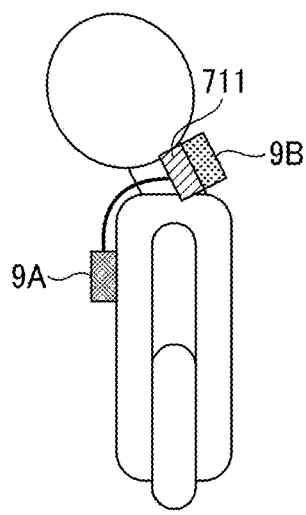
FIG. 38 is a diagram illustrating a user wearing an activity sensor including a vital sensor to detect vital data.

FIG. 38 is a diagram illustrating a user wearing the activity sensor 9B including the vital sensor 711 to detect vital data. As illustrated in FIG. 38, the activity sensor 9B can naturally come into contact with the nape of the neck through which large arteries pass. Thus, the heart rate can be measured by the photoelectric pulse method and the amount of perspiration can be measured using a hygrometer. By using the vital data together with the behavior presumed by the behavior presumption unit 67, the psychological safety in communication with a specific person can be presumed. For example, in a conversation between the users A and B, when the heart rate of the user B is high, the user B feels tension in communication with the user A. Thus, the psychological safety may be low.

The psychological safety refers to an environment with a mild atmosphere in which a person can be himself/herself without any pretense, fear of reaction of others, or feeling embarrassed. The psychological safety indicates how much a person can be himself/herself. The mild atmosphere refers to that a person can tell people honestly about what the person thinks or feels. In the mild atmosphere, a creative output is expected.

Figure 39:
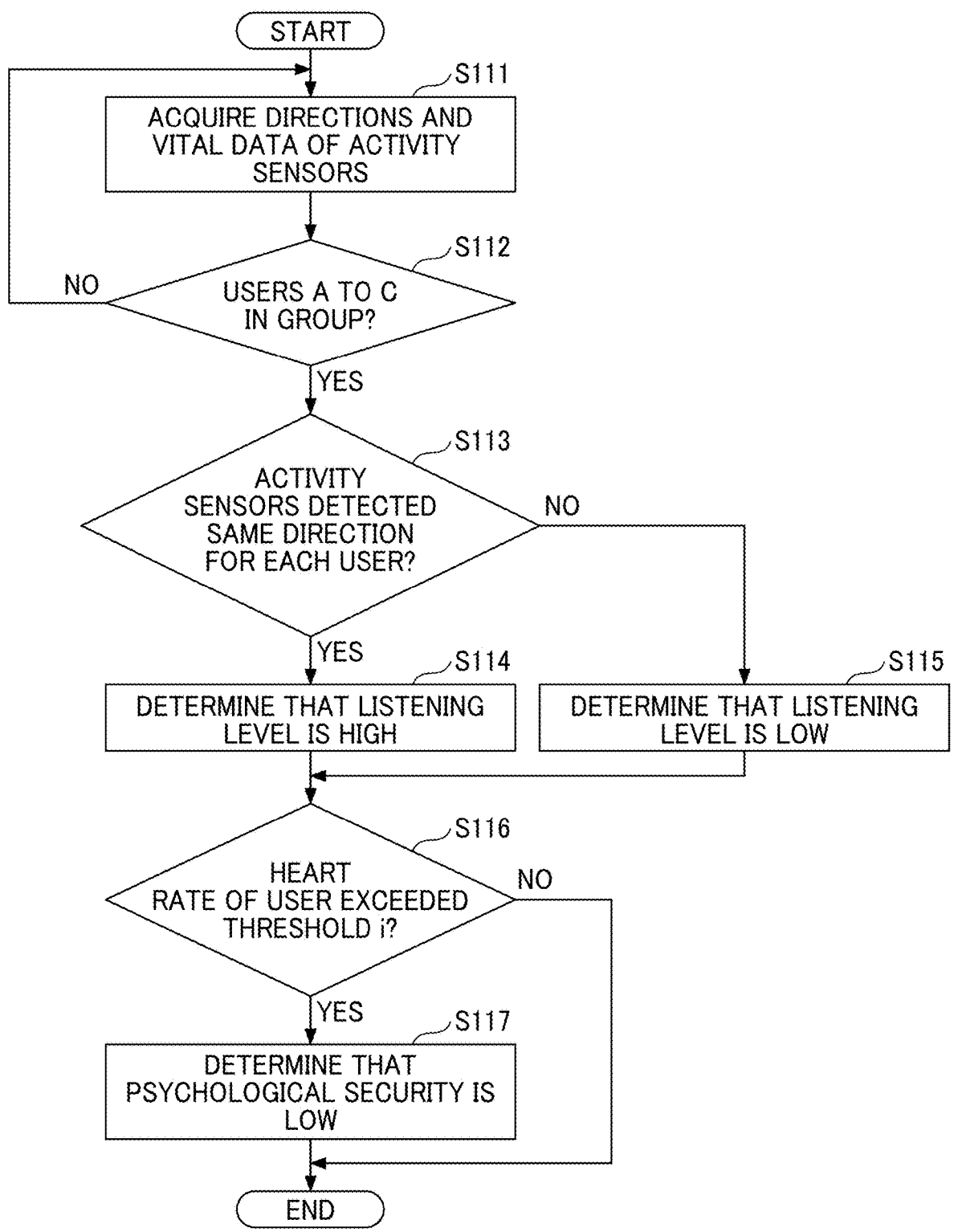
FIG. 39 is a flowchart of an example of a process in which a psychological-safety presumption unit presumes psychological safety based on vital data.

FIG. 39 is a flowchart of a process in which the psychological-safety presumption unit 41 presumes the psychological safety based on vital data.

The differences from the presumption described above with reference to FIG. 35 will be described with reference to FIG. 39.

In step S111, the direction acquisition unit 64 of the activity sensor 9A and the direction acquisition unit 113 of the activity sensor 9B repeatedly acquire the respective directions whereas the vital-data acquisition unit 66 of the activity sensor 9A and the vital-data acquisition unit 115 of the activity sensor 9B repeatedly acquire the respective vital data. Subsequent steps S112 to S115 may be substantially the same as steps S92 to S95 of FIG. 35.

In step S116, the psychological-safety presumption unit 41 determines whether the heart rate of the user has exceeded a threshold i. When the heart rate of the user has not exceeded the threshold i (NO in step S116), the process ends.

When the heart rate of the user has exceeded the threshold i (YES in step S116), in step S117, the psychological-safety presumption unit 41 determines that the psychological security of the user is low. The communication unit 68 of the activity sensor 9A notifies the information process system 10 of the identification information of the user and that the psychological security is low, in the repeated communication processes. The information processing system 10 can output a tone or a video image that increases psychological safety from the output device to prompt a creative output. The information processing system 10 may notify the activity sensor 9A of the speaker of the user with low psychological security. The activity sensor 9A of the speaker can notify the speaker of such a user by vibration or voice. The activity sensor 9A of the user with low psychological security may cause the activity sensor 9B of the user with low psychological security to output a tone that increases psychological security from the speaker.

In this way, the psychological security of the user can be presumed based on the directions and the vital data detected by the two activity sensors 9A and 9B. Accordingly, the control for increasing psychological security can be performed.

The activity sensor 9 according to the present embodiment is easy to be worn by a user because the user simply needs to wear the activity sensor 9 around the neck. In addition, the activity sensor 9 can detect various motions such as nodding, head shaking, and head cocking and various postures such as backward leaning and forward leaning because the activity sensor 9 detects the signals of acceleration and angular velocity at different body parts of the user.

Other Application Examples The present disclosure are not limited to the above-described embodiments specifically disclosed, and various modifications and changes can be made without departing from the scope of the claims. The information processing system 10 described in the present embodiment is merely an example, and various system configuration examples are available according to the application and purpose.

For example, one user may carry multiple activity sensors 9. This achieves a more accurate detection of the direction and behavior of the user.

The two activity sensors 9A and 9B of the present embodiment can detect behaviors other than the behaviors disclosed in one or more embodiments provided that the behaviors involve different movements between the body and the neck.

Further, the accelerations in the lateral direction and the front-back direction detected by the activity sensor 9A and the accelerations in the lateral direction and the front-back direction detected by the activity sensor 9B may be used for the determination of behaviors. The angular velocities about the three axes detected by the activity sensor 9A and the angular velocities about the three axes detected by the activity sensor 9B may be used for the determination of behaviors.

In a case where a model for determining a behavior from signals detected by the activity sensors 9A and 9B is created by machine learning, all of the accelerations along the three axes and angular velocities about the three axes detected by the activity sensors 9A and the accelerations along the three axes and angular velocities about three axes detected by the activity sensors 9B may be input. For example, a PC creates a model in which the correspondence between the signal of the sensor and the behavior is learned by deep learning. The activity sensor 9A inputs a datapoint obtained by sampling the signal of the sensor at predetermined time intervals to the model constructed by deep learning, and outputs a behavior. The model may be created by, for example, a support vector machine or a gradient boosting decision tree.

The information processing system 10 may determine the behavior of the user by integrating the direction and behavior information from the activity sensor 9 and the movement of the user detected by the camera 18.

In the block diagram such as FIG. 10, the processing of the information processing system 10 is divided into processing units (functional units) in accordance with main functions of the information processing system 10 to facilitate understanding of the processes performed by the information processing system 10. No limitation to a scope of the present disclosure is intended by how the processes are divided into processing units or by the name of the processing units. The processes performed by the information processing system 10 may be divided into a larger number of processing units depending on the nature of processes. Alternatively, one processing unit may be divided into multiple processing units.

Each of the functions of one or more embodiments described above may be implemented by one or more processing circuits or circuitry.

The apparatuses or devices described in one or more embodiments are merely illustrative of one of multiple computing environments for implementing the one or more embodiments disclosed herein. In some embodiments, the information processing system 10 includes multiple computing devices such as a server cluster. The multiple computing devices are configured to communicate with each other through any type of communication link including a network and a shared memory and perform the processes disclosed herein.

Further, the information processing system 10 may variously combine the disclosed processing steps. The elements of the information processing system 10 may be integrated into one device or may be divided into multiple devices. Further, one or more processes performed by the information processing system 10 may be performed by the information processing terminal 22.

According to a first aspect, a sensor device includes a first inertial sensor that contacts the body of a user, a second inertial sensor that contacts the neck of the user, and a behavior presumption unit that presumes a behavior of the user based on a first signal detected by the first inertial sensor and a second signal detected by the second inertial sensor.

According to a second aspect, in the sensor device of the first aspect, the first signal represents a first acceleration acting in a vertical direction of the user whereas the second signal represents a second acceleration acting in a front-back direction of the user. The behavior presumption unit presumes a behavior of the user nodding based on the first acceleration and the second acceleration.

According to a third aspect, in the sensor device of the first aspect, the first signal represents an acceleration acting in a vertical direction of the user whereas the second signal represents an angular velocity of rotation about an axis in a lateral direction of the user. The behavior presumption unit presumes a behavior of the user nodding based on the acceleration and the angular velocity.

According to a fourth aspect, in the sensor device of the first aspect, the behavior presumption unit calculates a frequency spectrum from each of the first signal and the second signal and presumes a behavior of the user nodding based on an intensity of the frequency spectrum calculated from each of the first signal and the second signal.

According to a fifth aspect, in the sensor device of the first aspect, the first signal represents a first acceleration acting in a vertical direction of the user whereas the second signal represents a second acceleration acting in the vertical direction of the user. The behavior presumption unit presumes a behavior of the user leaning backward based on the first acceleration and the second acceleration.

According to a sixth aspect, in the sensor device of the first aspect, the first signal represents a first acceleration acting in a vertical direction of the user whereas the second signal represents a second acceleration acting in the vertical direction of the user. The behavior presumption unit presumes a behavior of the user leaning forward based on the first acceleration and the second acceleration.

According to a seventh aspect, in the sensor device of the first aspect, the first signal represents a first acceleration acting in a vertical direction of the user whereas the second signal represents a second acceleration acting in the vertical direction of the user. The behavior presumption unit presumes a behavior of the user leaning rightward or leftward based on the first acceleration and the second acceleration.

According to an eighth aspect, in the sensor device of the first aspect, the first signal represents a first acceleration acting in a vertical direction of the user whereas the second signal represents a second acceleration acting in the vertical direction of the user. The behavior presumption unit presumes a behavior of the user standing and stooping based on the first acceleration and the second acceleration.

According to a ninth aspect, in the sensor device of the first aspect, the first signal represents a first angular velocity of rotation about an axis in a vertical direction of the user whereas the second signal represents a second angular velocity of rotation about the axis in the vertical direction of the user. The behavior presumption unit presumes a behavior of the user shaking his or her head based on the first angular velocity and the second angular velocity.

According to a tenth aspect, in the sensor device of the first aspect, the first signal represents a first acceleration acting in a vertical direction of the user whereas the second signal represents a second acceleration acting in the vertical direction of the user. The behavior presumption unit presumes a behavior of the user cocking his or her head based on the first acceleration and the second acceleration.

According to an eleventh aspect, in the sensor device of the first aspect, the first inertial sensor detects first direction information of the user whereas the second inertial sensor detects second direction information of the user. The sensor device communicates with an information processing system through a network. The information processing system includes a user-group presumption unit that groups multiple users based on positional information of the user received from the sensor device and the first direction information received from the sensor device. The sensor device further includes a listening-level presumption unit that presume a listening level of the user included in a group of the multiple users based on the first direction information and the second direction information.

According to a twelfth aspect, in the sensor device of any one of the second to sixth aspects, the first inertial sensor includes a microphone, and a voice-data acquisition unit that acquires utterance data of the user acquired by the microphone. When the behavior presumed by the behavior presumption unit and the utterance data acquired by the voice-data acquisition unit are registered in behavior utterance information associating a type of behavior with utterance data that reinforces the behavior, the behavior presumption unit determines that the behavior presumed is stronger than the behavior presumed when the utterance data associated with the behavior is not acquired.

According to a thirteenth aspect, the sensor device of the tenth aspect further includes a psychological-safety presumption unit. In the sensor device of the tenth aspect, the second inertial sensor detects vital data of the user, and the psychological-safety presumption unit presumes psychological safety of the user in a group of users based on the vital data.

According to a fourteenth aspect, in the sensor device of any one of the first to twelfth aspects, when the behavior presumption unit presumes the behavior, the sensor device outputs by light, sound, or vibration that the behavior is presumed.

According to a fifteenth aspect, in the sensor device of the first aspect, the first inertial sensor detects first direction information of the user whereas the second inertial sensor detects second direction information of the user. The sensor device communicates with an information processing system through a network. The information processing system includes a user-group presumption unit that groups multiple users based on positional information of the user received from the sensor device and the first direction information received from the sensor device. The sensor device transmits behavior information related to the behavior presumed by the behavior presumption unit to the information processing system. The information processing system transmits the behavior information to a second sensor device that is different from the sensor device that has transmitted the behavior information and in the same group as the sensor device. The sensor device outputs light, sound, or vibration according to the behavior information.

According to a sixteenth aspect, in the sensor device according to any one of the first to fifteenth aspects, the first inertial sensor and the second inertial sensor are coupled to each other via a serial cable into a necklace shape to communicate with each other.

According to a seventeen aspect, the sensor device of the sixteenth aspect, further includes a dummy having a shape same as the second inertial sensor and not including a sensor. The dummy and the second inertial sensor are symmetrically disposed with respect to the neck of the user. The first inertial sensor, the second inertial sensor, and the dummy have a necklace shape.

According to one or more aspects of the present disclosure, the user's behaviors can be presumed.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The invention claimed is:

1. A sensor device, comprising:
a first inertial sensor to contact a user;
a second inertial sensor to contact the user; and
circuitry configured to
presume a behavior of the user based on a first signal detected by the first inertial sensor and a second signal detected by the second inertial sensor;
detect first direction information of the user via the first inertial sensor;
detect second direction information of the user via the second inertial sensor;
communicate, with an information processing system through a network, positional information of the user and the first direction information, wherein the information processing system groups a plurality of users based on the positional information and the first direction information; and
presume a listening level of the user included in a group of the plurality of users based on the first direction information and the second direction information.

2. The sensor device according to claim 1, wherein
the first signal represents a first acceleration acting in a vertical direction of the user,
the second signal represents a second acceleration acting in a front-back direction of the user,
the behavior indicates the user nodding, and
the circuitry is configured to presume the behavior based on the first acceleration and the second acceleration.

3. The sensor device according to claim 1, wherein
the first signal represents an acceleration acting in a vertical direction of the user,
the second signal represents an angular velocity of rotation about an axis in a lateral direction of the user,
the behavior indicates the user nodding, and
the circuitry is configured to presume the behavior based on the acceleration and the angular velocity.

4. The sensor device according to claim 1, wherein the circuitry is further configured to:
calculate a frequency spectrum from each of the first signal and the second signal; and
presume the behavior of the user nodding based on an intensity of the frequency spectrum calculated from each of the first signal and the second signal.

5. The sensor device according to claim 1, wherein
the first signal represents a first acceleration acting in a vertical direction of the user,
the second signal represents a second acceleration acting in the vertical direction of the user,
the behavior indicates the user leaning backward, and
the circuitry is configured to presume the behavior of the user leaning backward based on the first acceleration and the second acceleration.

6. The sensor device according to claim 1, wherein
the first signal represents a first acceleration acting in a vertical direction of the user,
the second signal represents a second acceleration acting in the vertical direction of the user,
the behavior indicates the user leaning forward, and
the circuitry is configured to presume the behavior based on the first acceleration and the second acceleration.

7. The sensor device according to claim 1, wherein
the first signal represents a first acceleration acting in a vertical direction of the user,
the second signal represents a second acceleration acting in the vertical direction of the user,
the behavior indicates the user leaning rightward or leftward, and
the circuitry is configured to presume the behavior based on the first acceleration and the second acceleration.

8. The sensor device according to claim 1, wherein
the first signal represents a first acceleration acting in a vertical direction of the user,
the second signal represents a second acceleration acting in the vertical direction of the user, and
the behavior indicates the user standing and stooping, and
the circuitry is configured to presume the behavior based on the first acceleration and the second acceleration.

9. The sensor device according to claim 1, wherein
the first signal represents a first angular velocity of rotation about an axis in a vertical direction of the user,
the second signal represents a second angular velocity of rotation about the axis in the vertical direction of the user,
the behavior indicates the user shaking their head, and
the circuitry is configured to presume the behavior based on the first angular velocity and the second angular velocity.

10. The sensor device according to claim 1, wherein
the first signal represents a first acceleration acting in a vertical direction of the user,
the second signal represents a second acceleration acting in the vertical direction of the user,
the behavior indicates the user cocking their head, and the circuitry is configured to presume the behavior based on the first acceleration and the second acceleration.

11. The sensor device according to claim 1, wherein the first inertial sensor includes:
   a microphone; and
   circuitry configured to acquire utterance data of the user acquired by the microphone, and
   when the presumed behavior and the acquired utterance data are registered in behavior utterance information associating a type of behavior with utterance data that reinforces the behavior, the circuitry is configured to determine that the presumed behavior is stronger than the behavior presumed when the utterance data associated with the behavior is not acquired.

12. The sensor device according to claim 1, wherein the second inertial sensor detects vital data of the user, and the circuitry is configured to presume psychological safety of the user in a group of users based on the vital data.

13. The sensor device according to claim 1, wherein when the circuitry presumes the behavior, the circuitry is configured to output by light, sound, or vibration that the behavior is presumed.

14. The sensor device according to claim 1, wherein the circuitry is further configured to transmit behavior information related to the presumed behavior to the information processing system, the information processing system transmitting the behavior information to a second sensor device different from the sensor device that has transmitted the behavior information and in a same group as the sensor device, the second sensor device outputting light, sound, or vibration according to the behavior information.

15. The sensor device according to claim 1, wherein the first inertial sensor and the second inertial sensor are coupled to each other via a serial cable into a necklace shape to communicate with each other.

16. The sensor device according to claim 1, further comprising:
   a dummy having a same shape as the second inertial sensor and not including a sensor, wherein
   the dummy and the second inertial sensor are symmetrically disposed with respect to a neck of the user, and first inertial sensor, the second inertial sensor, and the dummy have a necklace shape.

17. A non-transitory recording medium storing a plurality of instructions which, when executed by one or more processors, causes the one or more processors to perform a presuming method, the method comprising:
   presuming a behavior of a user based on a first signal detected by a first inertial sensor configured to contact the user and a second signal detected by a second inertial sensor configured to contact the user;
   detecting first direction information of the user via the first inertial sensor;
   detecting second direction information of the user via the second inertial sensor;
   communicating, with an information processing system through a network, positional information of the user and the first direction information, wherein the information processing system groups a plurality of users based on the positional information and the first direction information; and
   presuming a listening level of the user included in a group of the plurality of users based on the first direction information and the second direction information.

18. A presuming method, comprising
   presuming a behavior of a user based on a first signal detected by a first inertial sensor configured to contact the user and a second signal detected by a second inertial sensor configured to contact the user;
   detecting first direction information of the user via the first inertial sensor;
   detecting second direction information of the user via the second inertial sensor;
   communicating, with an information processing system through a network, positional information of the user and the first direction information, wherein the information processing system groups a plurality of users based on the positional information and the first direction information; and
   presuming a listening level of the user included in a group of the plurality of users based on the first direction information and the second direction information.

* * * * *